US012688173B2

(12) United States Patent
Myers et al.

(10) Patent No.: US 12,688,173 B2
(45) Date of Patent: *\*Jul. 21, 2026*

(54) DETECTING DATA ANOMALIES USING ARTIFICIAL INTELLIGENCE

(71) Applicant: Citibank, N.A., New York, NY (US)

(72) Inventors: James Myers, New York, NY (US); Yael Man, Tel Aviv (IL); John E. Ortega, New York, NY (US); Alberto Cetoli, London (GB); Minjeong Cho, London (GB); Jason Ryan Engelbrecht, London (GB); Ines Teixeira, London (GB)

(73) Assignee: CITIBANK, N.A., NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/307,924

(22) Filed: Aug. 22, 2025

(65) Prior Publication Data

US 2025/0390477 A1 Dec. 25, 2025

Related U.S. Application Data

(63) Continuation of application No. 19/050,084, filed on Feb. 10, 2025, now Pat. No. 12,430,308, which is a (Continued)

(51) Int. Cl.
*G06F 16/00* (2019.01)
*G06F 16/215* (2019.01)

(52) U.S. Cl.
CPC .................................. *G06F 16/215* (2019.01)

(58) Field of Classification Search
USPC ........................................................ 707/687
See application file for complete search history.

(56) References Cited

U.S. PATENT DOCUMENTS 6,028,948 A 2/2000 Kil et al.
6,272,468 B1 8/2001 Melrose
(Continued)

FOREIGN PATENT DOCUMENTS

EP 1889153 A1 2/2008
WO 0184506 A2 11/2001
WO 0195266 A2 12/2001

OTHER PUBLICATIONS

Beltrame, Mirco, "RedactBuster: Entity Type Recognition from Redacted Documents," arXiv preprint arXiv:2404.12991, Apr. 2024, 20 pages.

(Continued)

*Primary Examiner* — Bai D Vu
(74) *Attorney, Agent, or Firm* — Perkins Coie LLP

(57) ABSTRACT

The systems and methods disclosed herein receive a dataset including an observed set of values for a set of variables. The system can use a first set of AI models to identify a set of anomalies in the observed set of values by comparing an observed set of patterns against multiple reference patterns. The system can use a second set of AI models to evaluate the identified anomalies by comparing an observed set of association rules with an expected set of association rules. The system can use a third set of AI models to generate reconfiguration commands to remove the identified anomalies. The reconfiguration commands can be automatically executed to modify the observed association rules to align with the expected association rules.

20 Claims, 15 Drawing Sheets

Related U.S. Application Data continuation-in-part of application No. 18/736,407, filed on Jun. 6, 2024.

(56) References Cited

U.S. PATENT DOCUMENTS

| | | | |
|---|---|---|---|
| 7,322,024 B2 | 1/2008 | Carlson et al. | |
| 8,412,813 B2 | 4/2013 | Carlson et al. | |
| 9,712,576 B1 | 7/2017 | Gill | |
| 9,836,664 B1 | 12/2017 | Ramaswamy et al. | |
| 11,509,730 B1 | 11/2022 | Peebles et al. | |
| 11,922,357 B2 | 3/2024 | Niyazov et al. | |
| 11,972,223 B1 | 4/2024 | Defoor et al. | |
| 2002/0143692 A1 | 10/2002 | Heimermann et al. | |
| 2002/0178039 A1 | 11/2002 | Kennedy | |
| 2003/0009355 A1 | 1/2003 | Gupta | |
| 2003/0033191 A1 | 2/2003 | Davies et al. | |
| 2003/0139907 A1 | 7/2003 | Mccarthy | |
| 2006/0165040 A1 | 7/2006 | Rathod et al. | |
| 2006/0248121 A1 | 11/2006 | Cacenco et al. | |
| 2007/0009160 A1 | 1/2007 | Loo et al. | |
| 2010/0324951 A1 | 12/2010 | Northover | |
| 2014/0355835 A1 | 12/2014 | Rodriguez-Serrano et al. | |
| 2014/0362919 A1 | 12/2014 | Zhou et al. | |
| 2016/0267359 A1 | 9/2016 | Gan et al. | |
| 2018/0083825 A1 | 3/2018 | Prabhakara et al. | |
| 2019/0257979 A1 | 8/2019 | Hyland | |
| 2020/0192906 A1 | 6/2020 | Visscher | |
| 2021/0103580 A1 | 4/2021 | Schierz et al. | |
| 2021/0150364 A1 | 5/2021 | Mixter | |
| 2021/0374562 A1 | 12/2021 | Chang et al. | |
| 2022/0044133 A1* | 2/2022 | Otto | G06N 5/04 |
| 2022/0107645 A1 | 4/2022 | Kalantidis et al. | |
| 2022/0237501 A1* | 7/2022 | Hamerla | G06F 3/0481 |
| 2022/0253592 A1 | 8/2022 | Rao et al. | |
| 2023/0077289 A1 | 3/2023 | Sloane et al. | |
| 2023/0105021 A1 | 4/2023 | Shah et al. | |
| 2023/0229738 A1 | 7/2023 | Cleere et al. | |
| 2023/0410483 A1 | 12/2023 | Chen et al. | |
| 2024/0135256 A1 | 4/2024 | Seo et al. | |
| 2024/0169272 A1 | 5/2024 | Macwilliams et al. | |
| 2024/0290065 A1 | 8/2024 | Park et al. | |

OTHER PUBLICATIONS

Baraldi, Lorenzo, "Learning to Mask and Permute Visial Tokens for Vision Transformer Pre-Training", arXiv preprint arXiv:2306.07346, 2023, 16 pages.

Meng, Jian, "Contrastive Dual Gating: Learning Sparse Features With Contrastive Learning", Proceedings of the IEEE/CVF Conference on Computer Vision and Pattern Recognition (CVPR), 2022, 9 pages.

Rezaeifar, Shideh, "Privacy-Preserving Image Template Sharing Using Contrative Learning", Entropy 2022, 2022, 16 pages.

* cited by examiner

Figure 1:
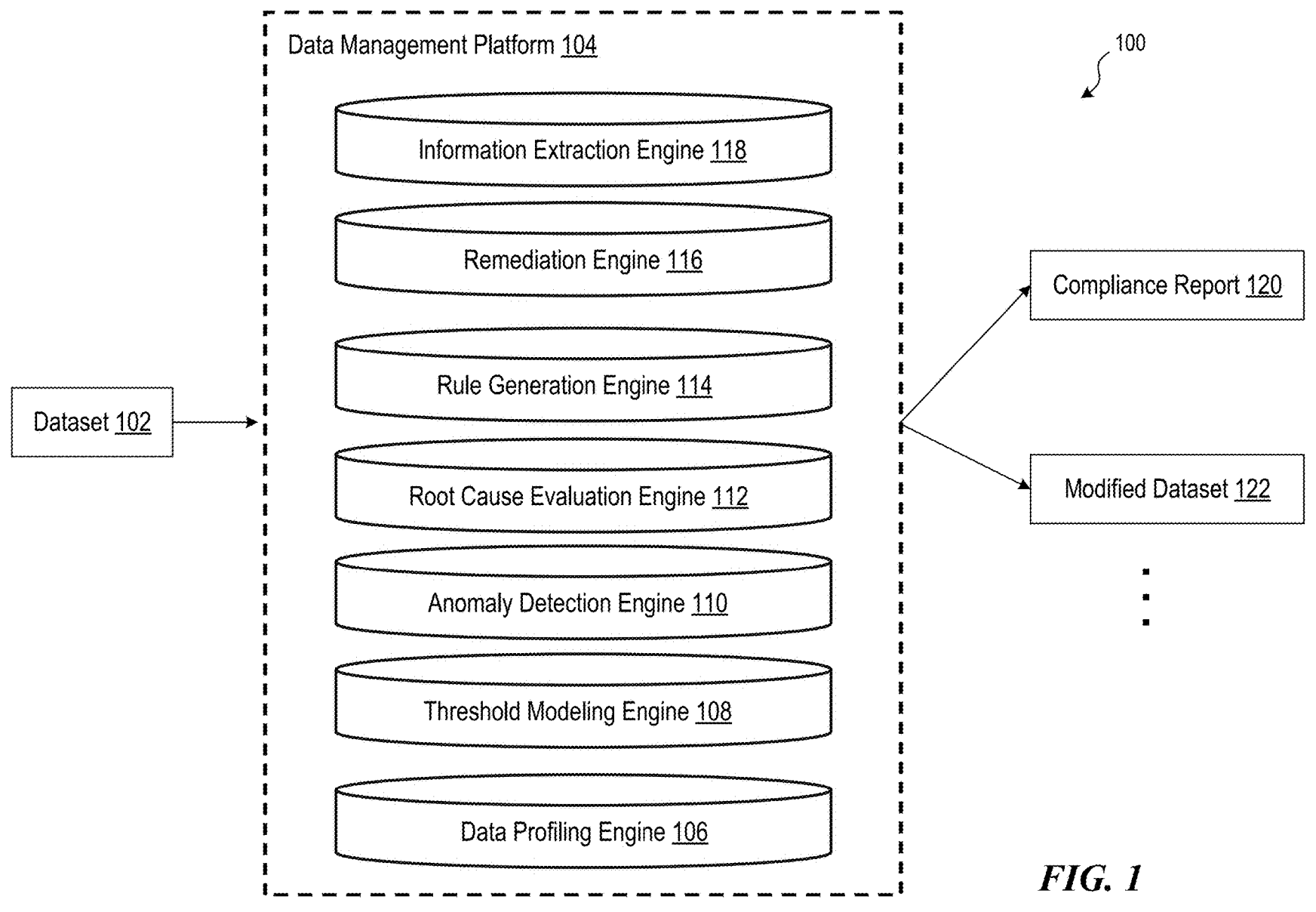

100

Compliance Report 120

Modified Dataset 122

· · ·

Data Management Platform 104

Information Extraction Engine 118

Remediation Engine 116

Rule Generation Engine 114

Root Cause Evaluation Engine 112

Anomaly Detection Engine 110

Threshold Modeling Engine 108

Data Profiling Engine 106

Dataset 102

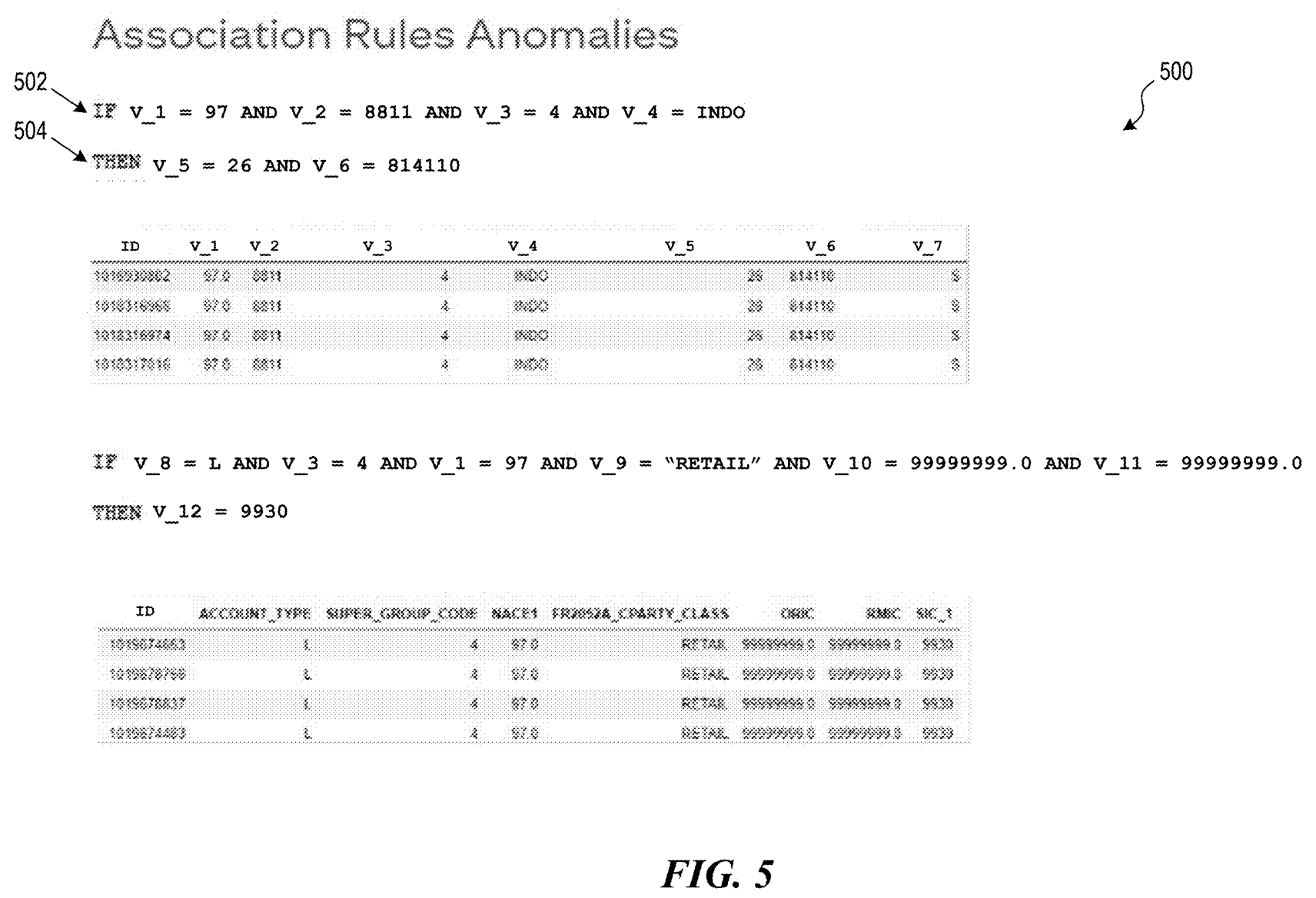

Association Rules Anomalies

502 → IF V_1 = 97 AND V_2 = 8811 AND V_3 = 4 AND V_4 = INDO

504 → THEN V_5 = 26 AND V_6 = 814110

| ID | V_1 | V_2 | V_3 | V_4 | V_5 | V_6 | V_7 |
|----|-----|-----|-----|-----|-----|-----|-----|

IF V_8 = L AND V_3 = 4 AND V_1 = 97 AND V_9 = "RETAIL" AND V_10 = 99999999.0 AND V_11 = 99999999.0

THEN V_12 = 9930

| ID | ACCOUNT_TYPE | SUPER_GROUP_CODE | NAICS | FRENSA_CRATY_CLASS | CRC | SBEC | SEC_1 |
|----|--------------|-------------------|-------|---------------------|-----|------|-------|

*FIG. 5*

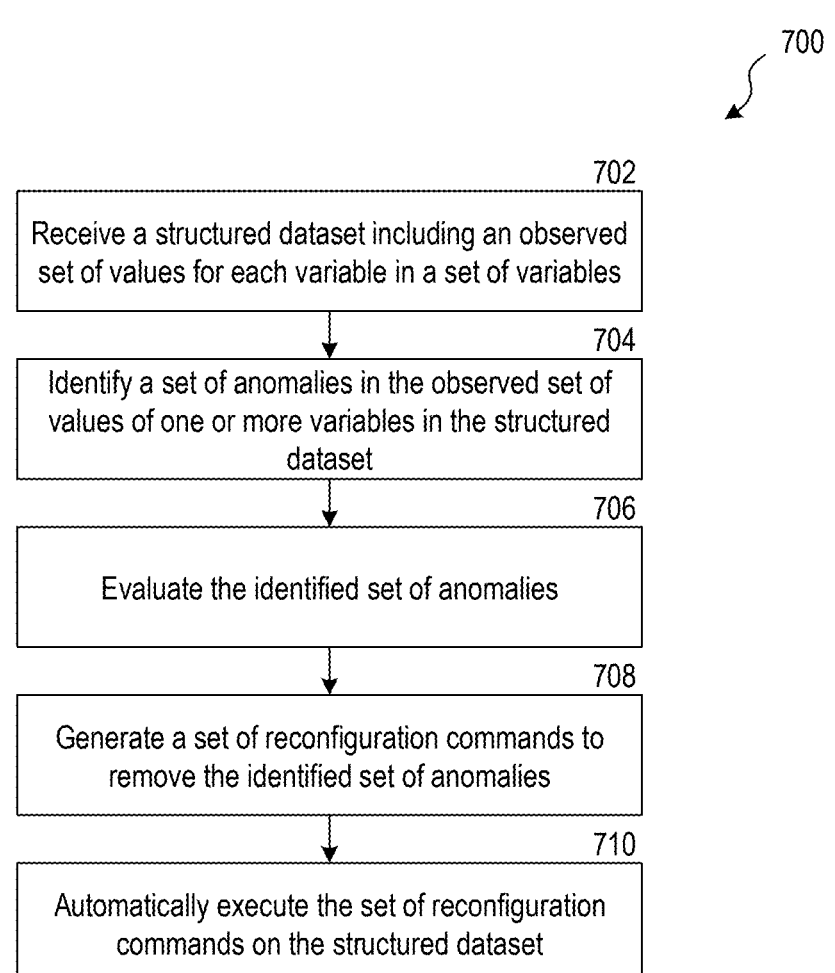

700

702

Receive a structured dataset including an observed set of values for each variable in a set of variables

704

Identify a set of anomalies in the observed set of values of one or more variables in the structured dataset

706

Evaluate the identified set of anomalies

708

Generate a set of reconfiguration commands to remove the identified set of anomalies

710

Automatically execute the set of reconfiguration commands on the structured dataset

*FIG. 7*

1000
Visual token MASK MASKING    1060
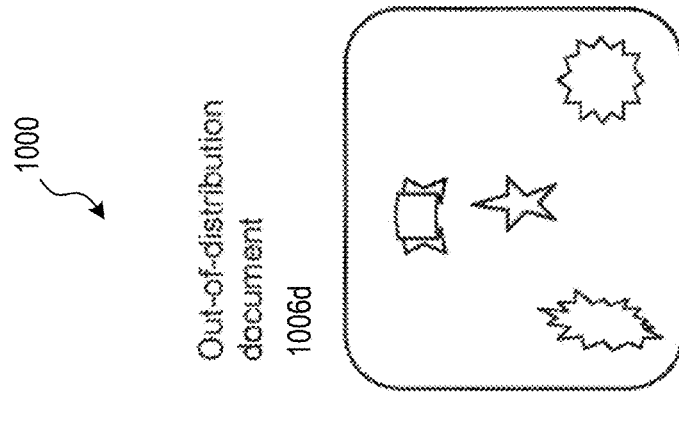
Out-of-distribution document
1006d
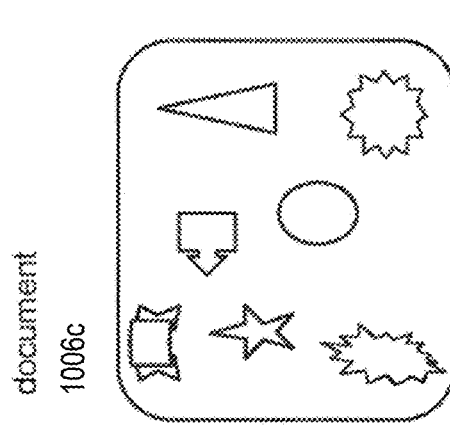
Out-of-distribution document
1006c
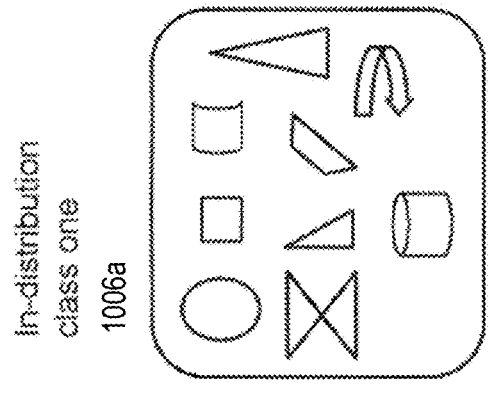
In-distribution class one
1006a
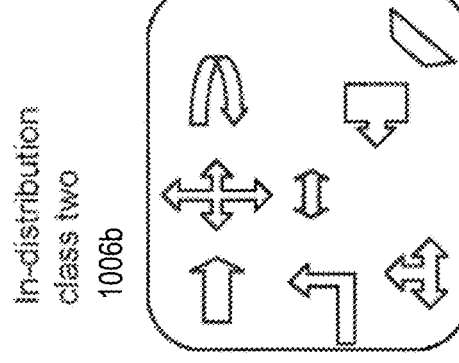
In-distribution class two
1006b
*FIG. 10*

Visual patch MASK MASKING 1160

Out-of-distribution document
1106c

In-distribution class one
1106a

In-distribution class two
1106b

1100

DETECTING DATA ANOMALIES USING ARTIFICIAL INTELLIGENCE

CROSS-REFERENCE TO RELATED APPLICATION(S)

This application is a continuation of U.S. application Ser. No. 19/050,084 entitled "DETECTING DATA ANOMALIES USING ARTIFICIAL INTELLIGENCE" and filed on Feb. 10, 2025, which is a continuation-in-part of U.S. patent application Ser. No. 18/736,407 entitled "OUT-OF-DISTRIBUTION PREDICTION" and filed Jun. 6, 2024. The content of the foregoing application is incorporated herein by reference in its entirety.

BACKGROUND

Data quality refers to the state of qualitative or quantitative pieces of information. In practice, data quality is a concern for professionals involved with a wide range of information systems, ranging from data warehousing and business intelligence to customer relationship management and supply chain management. Organizations rely on large amounts of structured and unstructured data to train artificial intelligence models, drive business strategies, maintain regulatory compliance, manage risk, and so forth. The accuracy, completeness, and reliability of the data directly impact an organization's ability to make informed decisions, operate efficiently, and maintain competitive advantages in increasingly data-driven markets. Thus, poor data quality (e.g., containing anomalies) can result in severe operational, financial, and regulatory consequences for organizations. Anomalies (e.g., an observation, or subset of observations, that are inconsistent with the remainder of the dataset, excessive noise) in datasets can lead to flawed analytics and increased operational risks.

BRIEF DESCRIPTION OF THE DRAWINGS

FIG. 1 illustrates an example environment of a data management platform for improving data quality of a dataset.

FIG. 5 illustrates an example environment of a root cause evaluation engine of the data management platform of FIG. 1 for identifying root causes of the anomalies of the dataset.

FIG. 7 is a flow diagram illustrating an example process of remediating anomalies using the data management platform of FIG. 1.

FIG. 10 illustrates an example of visual token mask masking.

DETAILED DESCRIPTION

Figure 2:
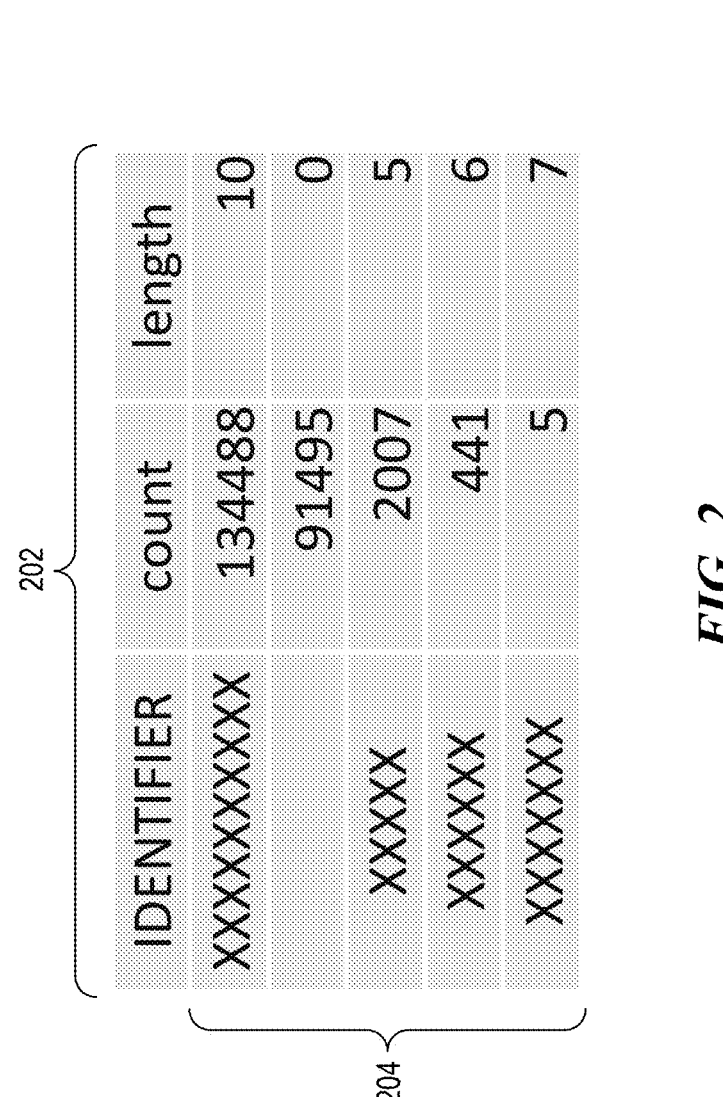
FIG. 2 illustrates an example environment of a data profiling engine of the data management platform of FIG. 1 for automatically detecting features of the dataset.

In today's data-driven world, organizations across various industries rely heavily on data to train artificial intelligence (AI) models to make informed decisions, modify operations, and so forth. However, organizations often face the problem of storing large amounts of unusable "polluted" data including anomalies that are reflective of social biases at the time the data was collected. Anomalies refer to any type of inconsistency with expected data, including deviations, outliers, errors, or irregular patterns that do not conform to the established norms or expected values within a dataset. Historical data often contain biases that, once ingested into AI models (e.g., to train the AI model), can perpetuate and even amplify these historical biases, which may lead to unfair and/or discriminatory outcomes. Cleaning up such polluted data is a complex and resource-intensive task, as it requires identifying and correcting inaccuracies, filling in missing information, addressing embedded biases, and so forth. The challenge is further compounded by the fact that once biased data is used to train AI models, it can be difficult to remove the influence of these biases.

Further, training data available to these organizations often includes anomalies such as excessive noise within datasets. Noise in data refers to irrelevant or random information that is not useful for the intended task (e.g., of the AI model) and can obscure the underlying patterns. Noise can come from various sources, such as errors in data collection, transmission, or entry, and can include outliers, missing values, irrelevant features, and so forth. Training AI models on data with noise is challenging because the models may learn to recognize and replicate these irrelevant patterns, leading to overfitting. Overfitting occurs when a model performs well on training data but poorly on new, unseen data because the model has learned the noise rather than the true underlying patterns, which results in reduced generalization ability and accuracy of the AI model. The presence of anomalies in training data can significantly impact the performance and reliability of AI models, as the models may learn incorrect patterns and make flawed predictions. For instance, in the financial sector, inaccurate transaction data can result in erroneous risk assessments, while in healthcare, inconsistent patient records can lead to improper treatment plans.

As such, the inventors have developed a system for improving data quality (e.g., reducing anomalies) using an AI model (hereinafter the "data management platform").

The data management platform receives a dataset including an observed set of values for a set of variables. The data management platform can use a first set of AI models (e.g., embedding model, non-generative model, generative model, large language model, AI model) to identify a set of anomalies (e.g., noise, missing values, biases, and so forth) in the observed set of values by comparing an observed set of patterns (e.g., expected distributions, expected values, and so forth) against multiple reference patterns (e.g., expected distributions, expected values, and so forth). The system data management platform can use a second set of AI models (same as or different from the first set of AI models) to evaluate the identified anomalies by comparing an observed set of association rules (e.g., "if/then" statements characterizing the observed set of values) with an expected set of association rules (e.g., "if/then" statements characterizing an expected set of values). The system data management platform can use a third set of AI models (same as or different from the first and/or second set of AI models) to generate reconfiguration commands to remove the identified anomalies. The reconfiguration commands can be automatically executed to modify the observed association rules to align with the expected association rules.

In some implementations, the data management platform can enable users to select a threshold for identifying the anomalies. For example, the data management platform can enable users to select how many degrees of standard deviation (SD) should be allowed when determining whether particular subsets of the observed set of values belong to the same corpus). Additionally, in some implementations, the data management platform can tag the observed set of values for a particular use case the observed set of values are being used for to ensure that the observed set of values are appropriately contextualized for the current use case. Using the data management platform, data can be cleaned prior to using the data for training an AI model. Thus, the data management platform can ensure that the training data is free from biases, inconsistencies, noise, and so forth, thereby improving the accuracy and reliability of the AI models. The data management platform can automatically identify and correct anomalies within data such as training data, significantly reducing the time and resources used for data cleaning.

Further, a machine learning system may provide inaccurate information when presented with documents that are out-of-distribution from the types of documents used to train the machine learning model. For example, current machine learning systems may misclassify documents that have similarities to, but are actually different from, documents in the training data. This occurs partly because the prediction capabilities of current machine learning models are limited by the initial training data, which result in machine learning models that give too much weight to less-significant features in the data.

Thus, the data management platform disclosed herein (e.g., via an out-of-distribution prediction system associated with the data management platform) can further determine whether input data of a machine learning model is out-of-distribution data, by training a machine learning (ML) model with masked training data and providing masked input data to the trained machine learning model. Users of the systems may mistakenly upload input data that includes irrelevant documents that are significantly different to "in domain" data, which the machine learning model has been trained to predict. In this disclosure, a robust outlier detection is implemented that allows an out-of-distribution system to identify such outliers and subsequently send the outliers for manual review. In at least one implementation, an out-of-distribution system detects outlier data by randomly masking portions of training data, which results in a machine learning model that assigns more weight to the most important features in the data. In at least one implementation, the masking of training data results in a greater difference between vectors of relevant data versus irrelevant data, making it easier to identify when irrelevant data, such as an incorrect document, is input into the machine learning model.

In at least one implementation, a system extracts features from a training document for training a machine learning model. Further in the implementation, the system selects a portion of these features to omit (e.g., mask) from a training forward propagation. Then, in the implementation, the system trains the machine learning model to produce a trained machine learning model using a different set of features that have not been masked. In at least one implementation, the trained machine learning model output information that may be used to classify documents and distinguish between an out-of-distribution document and an in-domain document.

In at least one implementation, a system masks portion of training data to produce mask training data where the mask training data includes both in-domain data and out-of-distribution data. Further in the implementation, the system trains a machine learning model using the masked training data to produce a trained machine learning model. Then, in the implementation, the system receives input data to be classified by the trained machine learning model and masks input data to produce masked input data. Then, in the implementation, the system provides the masked input data to the machine learning model. Finally, as a result of providing the masked input data to the machine learning model, the system receives, as an output of the machine learning model, a classification of the input data and determines, based on the classification, that the input data is out-of-distribution data.

In at least one implementation, the training data used to train the machine learning model includes both in-distribution data and out-of-distribution data. The terms "in-distribution," "in-domain," and "ID" are used interchangeably in the present disclosure and are intended to have corresponding scope. Similarly, the terms "out-of-distribution," "out-of-domain," and "OOD" are likewise used interchangeably in the present disclosure and are intended to have corresponding scope. In at least one implementation, the training data includes at least one of plaintext, image, or layout features. In at least one implementation, the training data may include a combination of either of the plaintext, image, or layout features. In at least one implementation, a training procedure to train the machine learning model brings embeddings of similar classes closer together and embeddings of dissimilar classes further apart.

In at least one implementation, the masking of training or input data corresponding to plaintext data may include token text masking. For example, a random sentence may be tokenized with random masked tokens and encoded using attention masking. In another example, a random sentence may be tokenized with random masked tokens and padding. The tokenized sentence may then be encoded using attention masking that includes the padded tokens. In at least one implementation, the padding of tokens may be added to the end of tokenized sentence of a particular length. The padding is added at least because the particular length of the sentence may be less that the length of an encoding model that is being used by the out-of-distribution prediction system. In at least one implementation, an attention score of the attention mask with padding indicates which token should be active in training the machine learning model and/or generating predictions by the machine learning model. For example, the attention score indicates tokens corresponding to the sentence length which are active, and the rest of the padding tokens should be zero.

In at least one implementation, the system determines which portions of the training data to mask for the machine learning model using pseudorandom process. In at least one implementation, the system determines portions of the training data to mask based on a parameter value, obtained by the system, that indicates a specified size or number of portions of the training data to be masked. In at least one implementation, the system masks portions of training data based on the parameter. In at least one implementation, the system obtains the parameter from a user of the system. In at least one implementation, the system masks portions of training and/or input data based a consistent (e.g., same) position or region in the text and/or image pixels. In another implementation, the system masks portions of training and input data based on selective masking of important features learned by the machine learning model. For example, the system may determine particular features from the encoding layers of the machine learning model information and aggregate the information to identify which features were activated (e.g., repeatedly identified as contributing towards making correct predictions), and then masking/omitting one or more of those features.

In at least one implementation, the system determines that the input data is out of distribution by using at least one of a confidence score (also referred to as a confidence measure) or a multivariate distance metric, alternatively known as a distance metric or a distance metric. In at least one implementation, the confidence score may be generated by defining boundaries of a distribution of confidence scores of classes using the masked training data. In at least one implementation, during inferencing operations, a masked dense vector of a new document is compared to a threshold value of the confidence scores to determine if the new document is an out-of-distribution document. In at least one implementation, the distance metric may be generated using attention and/or self-attention. For example, a sentence or word embedding may be processed by an attention-based network to learn feature representation of contexts. In at least one implementation, in token text masking an attention mask may be used to indicate which token are padding, by placing "0s" in those positions, and placing "1s" in positions that should be attended to. In at least one implementation, the system determines that the input data is out-of-distribution by comparing a dense vector associated with the masked input data to another dense vector associated with the masked training data. In at least one implementation, the dense vectors are extracted from the plaintext data or image data. In at least one implementation, the dense vectors are based on features of plaintext, or images extracted from encoding layers. In at least one implementation, input data determined to be out-of-distribution is an unexpected prediction, also known as an outlier prediction. For example, the system can extract a dense embedding vector of an input document and then compare this to the dense embedding vectors that have been extracted from the masking of the training data, and then get the distance cost which can be used to generate predictions and determine whether an input document is out-of-distribution or an outlier. In at least one implementation, a document may be out-of-distribution if the data is significantly different from what the machine learning model is trained to predict. In at least one implementation, an outlier, alternatively known as an outlier document, is a data point that significantly deviates from a distribution of data points. In some implementations, the system determines an outlier if the data point is below a specified confidence score of predictions learned during training of the machine learning model. In at least one implementation, the outlier may be detected by the system if the machine learning model outputs a prediction that is an unexpected data point relative to expected classifications of in-domain data and/or out-of-distribution data. In at least one implementation, an outlier may be identified by the machine learning model performing outlier analysis. In at least one implementation, an outlier may result from a user of the system uploading a document in error that is not relevant for a particular machine learning operation. In at least one implementation, an outlier that is detected by the machine learning model may be sent to a client device for manual review. In at least one implementation, as a result of the system determining that the input data is out-of-distribution data, the system causes the input data to be manually reviewed.

Techniques described and suggested in the present disclosure improve the field of computing, especially the field of machine learning, by generating predictions of input data is out-of-distribution using token masking and patch masking. Additionally, techniques described and suggested in the present disclosure improve the efficiency/functioning of computing systems performing machine learning by reducing the amount of irrelevant or out-of-distribution data being used to train the machine learning model. Moreover, techniques described and suggested in the present disclosure are necessarily rooted in computer technology in order to overcome problems specifically arising with the computing resources required by machine learning models to generate predictions and detect outliers that are irrelevant to the machine learning model operations and send the outliers for manual review.

While the current description provides examples related to LLMs, one of skill in the art would understand that the disclosed techniques can apply to other forms of machine learning or algorithms, including unsupervised, semi-supervised, supervised, and reinforcement learning techniques. For example, the disclosed intent-based data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Data Management Platform

FIG. 1 illustrates an example environment 100 of a data management platform 104 for improving data quality of a dataset. Environment 100 includes dataset 102, data management platform 104, compliance report 120, modified dataset 122, anomalies 124, and remediation actions 126. Implementations of example environment 100 can include different and/or additional components or can be connected in different ways.

The dataset 102 can include structured and/or unstructured data. Structured data refers to data organized in a predefined manner, such as databases or spreadsheets (e.g., in rows and columns, in a graph, and so forth), while unstructured data refers to data without a predefined data model, such as emails, multimedia files, and other free-form documents. For example, a company's customer database can include structured data such as customer identifiers and transaction records, while unstructured data includes customer feedback emails. The data management platform 104 ingests the dataset 102 and performs one or more validation checks on the dataset 102. The data management platform 104 can be cloud-based or stored on a local server. The validation actions performed by the data management platform 104 in FIG. 1 can be executed by data profiling engine 106, threshold modeling engine 108, anomaly detection engine 110, root cause evaluation engine 112, rule generation engine 114, remediation engine 116, and/or information extraction engine 118.

The data profiling engine 106 can identify dataset's 102 structure, data types, and/or indicate one or more attributes/features of the dataset 102 (e.g., typos, wrong format, out of range values). The data profiling engine 106 can, using the variables and observations within dataset 102, automatically identify attributes of the dataset 102, such as the number of records, field types (e.g., integers, floats, strings), variables, variable values, and/or frequency distributions. In some implementations, the data profiling engine 106 determines the features of each variable (i.e., univariate). For numerical data, the data profiling engine 106 can calculate mean, median, standard deviation, interquartile range, and so forth. For categorical data, the data profiling engine 106 can calculate the number of categories, the number of observations in each category, and so forth. Using the identified features, the data profiling engine 106 can, in some implementations, identify one or more anomalies of the dataset 102 in one or more variables. For example, the data profiling engine 106 can identify values beyond a certain SD from the mean. The thresholds used in determining anomalies can be configurable by a user (e.g., by defining the threshold SD, threshold variance, combination threshold that requires satisfying both the threshold SD and the threshold variance, etc.). For example, the data profiling engine 106 can detect that customer birth dates are missing in a certain percentage of records.

In some implementations, data profiling engine 106 can identify metadata within dataset 102 associated with data lineage and/or versioning to monitor transformations of data within dataset 102. Further methods of identifying attributes/features of the dataset are discussed with reference to FIG. 7. In some implementations, the data profiling engine 106 can generate an output file (e.g., text, image, audio, video, multi-modal) indicating the identified structure, data types, and/or one or more features of the dataset 102 (e.g., on a graphical user interface). The data profiling engine 106 can be data agnostic, meaning that the data profiling engine 106 does not use prior context or knowledge about the dataset 102 to identify the dataset's 102 features. In some alternative implementations, the data profiling engine 106 could be data discerning whereby the data profiling engine applies prior context or knowledge about the dataset 102 to more rapidly identify the dataset's features.

The threshold modeling engine 108 can identify one or more anomalies by dynamically generating thresholds and/or setting static thresholds for particular data attributes (e.g., variable values, means, SD, interquartile range, and so forth) determined by the data profiling engine 106. For example, the threshold modeling engine 108 can identify anomalies in seasonal attributes based on historical data using univariate analysis by determining thresholds (e.g., ranges of variable values) during different times. The threshold modeling engine 108 can use historical data to establish baseline patterns (e.g., using an autoregressive integrated moving average (ARIMA) model) and continuously update the thresholds at various intervals, e.g., as new data (e.g., dataset 102) is ingested, at preset time intervals, or at preset data quantities. By using historical data, the threshold modeling engine 108 can account for expected variations and seasonal trends, reducing the likelihood of false positives.

The anomaly detection engine 110 can detect univariate and/or multivariate anomalies within dataset 102. The anomaly detection engine 110 can flag transactions that deviate significantly from established thresholds or exhibit unusual correlations (e.g., indicating potential errors) using methods discussed with reference to FIG. 7. The anomaly detection engine 110 can use one or more anomaly detection modelling techniques such as clustering, regression analysis, anomaly score computation, and so forth, to identify outliers. The anomaly detection engine 110 can assign one or more anomaly scores for each data point in dataset 102 and compare the score against the established thresholds to determine if an anomaly exists. In some implementations, the anomaly detection engine 110 uses a majority vote between multiple models to assign the anomaly score.

In some implementations, anomalies detected by the anomaly detection engine 110 can use predefined context or knowledge bases. The context or knowledge bases can be tailored to the specific use case or application of dataset 102, such as appending dataset 102 to another dataset. A use case refers to a specific situation or scenario in which the dataset 102 is applied to achieve a particular goal (e.g., resolving missing values) or solve a specific problem (e.g., whether two datasets belong to the same corpus). For instance, an anomaly in dataset 102 can be identified if the data of dataset 102 exceeds a certain standard deviation threshold value from a reference dataset, indicating that the dataset 102 potentially fails to belong to the same corpus (e.g., group of artifacts, group of documents) as the reference dataset. In some implementations, the threshold value is configurable by a user of the data management platform 104. For example, the user can select how many degrees of standard deviation should be allowed when determining if an observed set of values belongs to the same corpus as another set of values. If the standard deviation of both the observed set of values and the other set of values exceeds the user-defined standard deviation threshold, the observed values can be raised as an anomaly.

The root cause evaluation engine 112 can identify one or more events associated with (e.g., causing, linked to, mapped to) the anomalies 124 using correlations between or among values of different data variables in the dataset 102 and identifying sequence patterns that precede anomalies. For instance, the root cause evaluation engine 112 can identify that a particular system error during data entry leads to inconsistencies in the dataset 102. The root cause evaluation engine 112 can use techniques such as causal inference, dependency analysis, and/or sequence mining to trace the anomaly back to its source. The source of an anomaly can be a specific variable or multiple variables within the dataset. For instance, an anomaly can be traced back to a single variable that is significantly higher or lower than the expected range. Alternatively, the source can include multiple variables that together form a pattern indicative of, for example, data entry errors, system errors, hardware malfunctions, and so forth.

In some implementations, the rule generation engine 114 can automatically generate/formulate association rules based on historical data patterns and observations. The association rules define expected data behaviors and relationships of dataset 102. For example, an association rule can state that if a value of a variable exceeds a certain threshold, the value of a different variable is of a certain category. Further methods of determining root causes of detected anomalies are discussed with reference to FIG. 5 and FIG. 7.

The remediation engine 116 can generate one or more actions (e.g., workflows, computer-executable tasks) to remediate anomalies 124. The actions can include data correction, alert generation, or perform one or more computer-executable tasks to rectify data inconsistencies. For instance, the remediation engine 116 can automatically correct data mismatches by referencing a master data source or filling in missing values of a dataset using predicted values. In conjunction or alternatively, the remediation engine 116 can use one or more predefined rules, machine learning models, and so forth to recommend and/or implement remediation actions upon user authorization. In some implementations, remediation engine 116 can integrate with external workflow management systems to automate remediation processes involving multiple tasks.

The modified dataset 122 refers to the dataset 102 after the remediation actions are performed on the dataset 102. In some implementations, modified dataset 122 can include enriched data, where missing values are imputed, or additional context is added based on reference data sources. The data management platform 104 can track changes to maintain a history of data modifications for audit purposes. The compliance report 120 can be generated by the data management platform 104 to document the compliance status of dataset 102 with specified data quality standards/guidelines/regulations. The compliance report 120 can include identified anomalies, remediation actions, data quality metrics, version, and so forth.

In some implementations, the information extraction engine 118 can extract data from unstructured sources and use dataset 102 to determine anomalies within the unstructured source and/or the dataset 102. For example, the information extraction engine 118 can use natural language processing (NLP) techniques and other methods discussed with reference to FIG. 7 to parse text, recognize entities, and transform unstructured data into a structured format. In some implementations, information extraction engine 118 can ingest text, audio, images, videos, and so forth.

FIG. 2 illustrates an example environment 200 of the data profiling engine 106 of the data management platform 104 of FIG. 1 for automatically detecting features of an ingested dataset. Environment 200 includes variables 202 and observations 204. Implementations of example environment 200 can include different and/or additional components or can be connected in different ways.

The data profiling engine 106 can identify variables 202, which represent the different attributes or fields within the dataset (e.g., dataset 102 in FIG. 1). For example, in FIG. 2, the attributes can include "Identifier," "count," and "length."

The variables 202 can include numerical data, categorical data, dates, and other types of data points that define the structure of the dataset. For example, in a customer database, variables 202 can include customer ID, name, birth date, transaction amount, and product category. In some implementations, variables 202 can include derived attributes, such as calculated fields or aggregated metrics.

Further, the data profiling engine 106 can identify observations 204, which refer to the individual records or entries within the dataset that contain values for each of the variables 202. Each observation 204 represents a single instance of data, such as a row in a database table. Observations 204 can be a single value or multiple values. For example, in a sales dataset, an observation 204 can represent a single transaction, including details such as the transaction ID, date, customer ID, and amount. In some implementations, observations 204 can include time-series data, where each observation represents a data point in a sequence over time.

Figure 3:
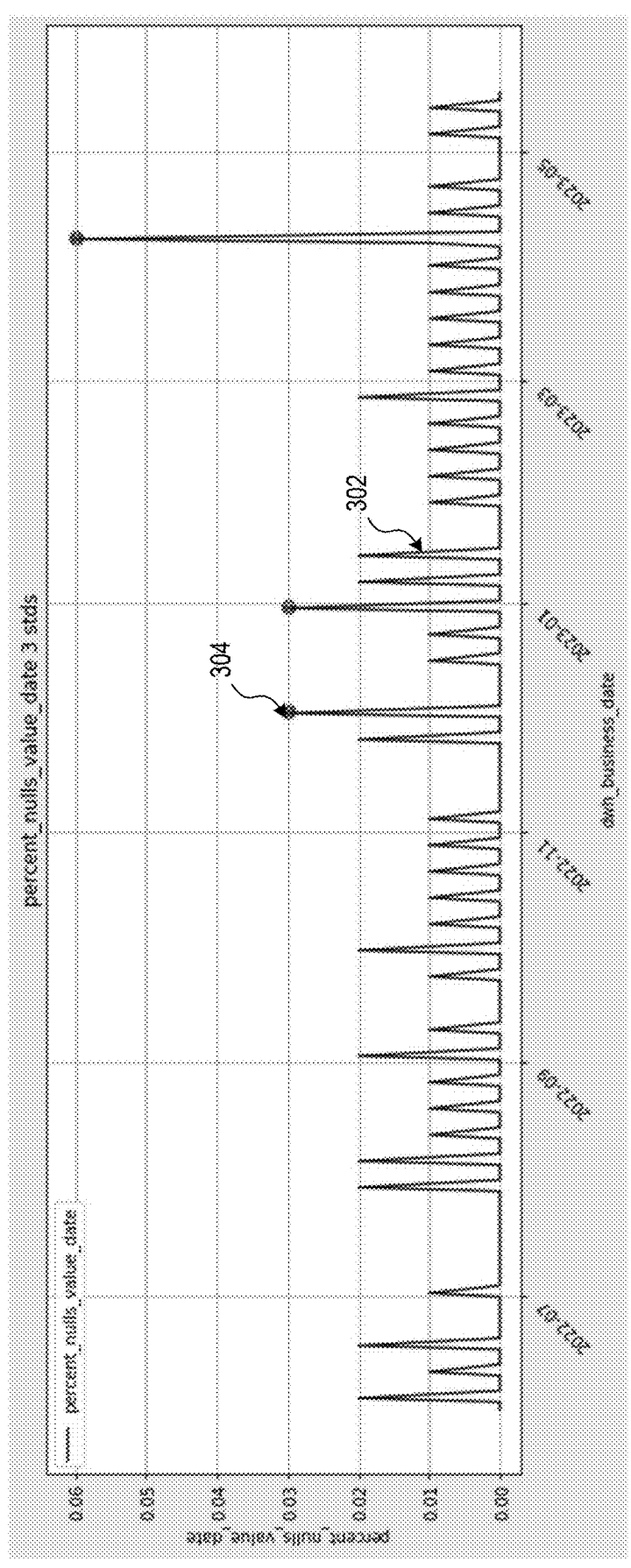
FIG. 3 illustrates an example environment of a threshold modeling engine of the data management platform of FIG. 1 for dynamically detecting univariate anomalies of the dataset.

FIG. 3 illustrates an example chart 300 of a threshold modeling engine 108 of the data management platform 104 of FIG. 1 for dynamically detecting univariate anomalies of the dataset. Chart 300 includes observations 302 and anomalies 304. Implementations of example chart 300 can include different and/or additional components or can be connected in different ways.

The observations 302 can be the same as or similar to observations 204. The observations 302 can refer to the individual data points or records within the dataset that are analyzed to detect anomalies. Each observation contains values for one or more variables, representing a single instance of data. The anomalies 304 are a subset of the observations 302 that deviate significantly from the expected patterns or thresholds established by the threshold modeling engine 108. The deviations can indicate potential errors or other unusual activities. The threshold modeling engine 108 can operate within chart 300 to dynamically detect univariate anomalies by identifying the distribution and variability of observations 302. The threshold modeling engine 108 can establish dynamic thresholds that adapt to changes in the data over time. For instance, the threshold modeling engine 108 can adjust the threshold for acceptable observation values based on historical data, accounting for seasonal variations. In some implementations, the threshold modeling engine 108 can use autoregressive integrated moving average (ARIMA) models to forecast future values and detect anomalies based on predicted trends.

Figure 4:
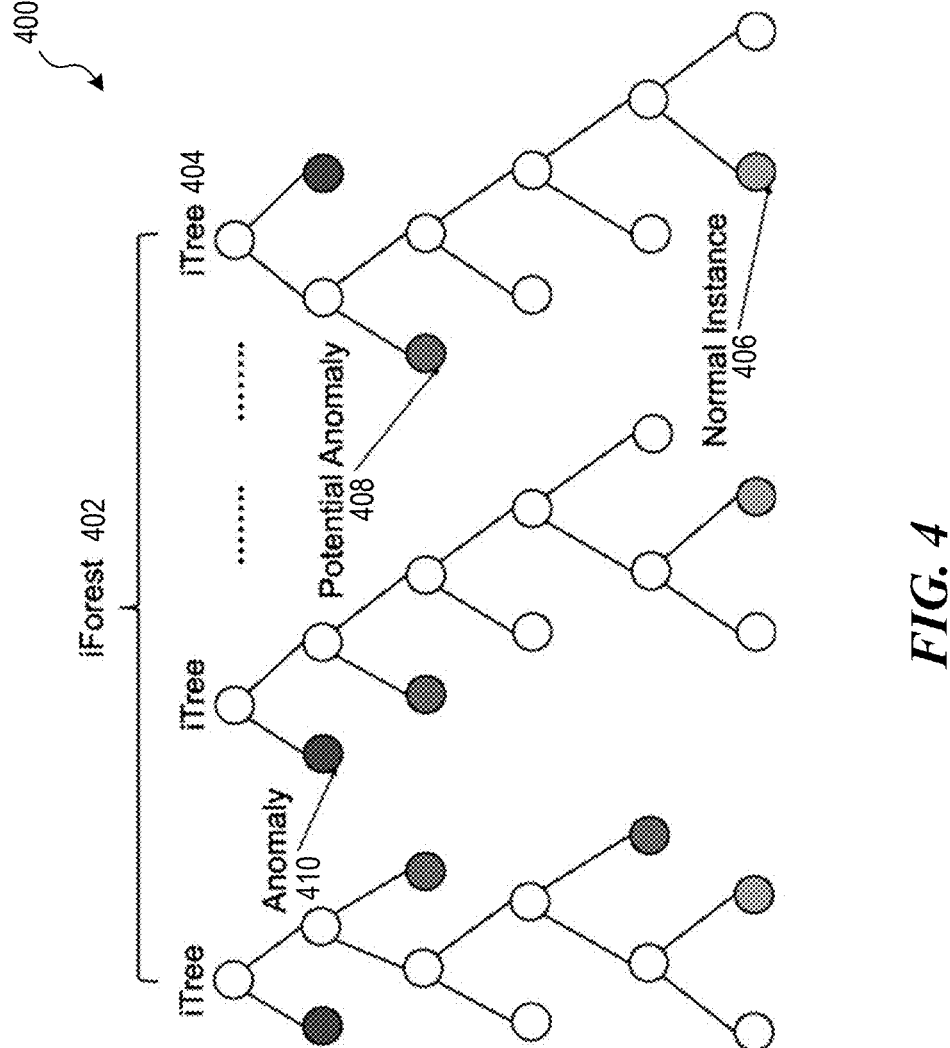
FIG. 4 illustrates an example environment of an anomaly detection engine of the data management platform of FIG. 1 for dynamically detecting multivariate anomalies of the dataset.

FIG. 4 illustrates an example environment 400 of an anomaly detection engine 110 of the data management platform 104 of FIG. 1 for dynamically detecting multivariate anomalies of the dataset. Environment 400 includes anomaly detection model 402, binary tree 404, non-flagged observation 406, flagged observation 408, and anomaly 410. Implementations of example environment 400 can include different and/or additional components or can be connected in different ways.

The anomaly detection model 402, such as an isolation forest, can be used to identify anomalies within a dataset by isolating observations that deviate significantly from the norm. The anomaly detection model 402 can, for example, construct multiple binary trees (isolation trees) to partition the data. Observations that require fewer splits to isolate can be considered anomalies. In some implementations, anomaly detection model 402 can use other techniques such as clustering-based methods (e.g., DBSCAN), statistical methods (e.g., Z-score), or neural networks (e.g., autoencoders) to detect anomalies. The binary tree 404 within the anomaly detection model 402 is a data structure that can be used by the anomaly detection model 402 to recursively partition the dataset into smaller subsets. Each node in the binary tree can represent a decision based on a feature value, and the branches can represent the possible outcomes of the decision. The partitioning continues until each observation is isolated in a leaf node. In some implementations, binary tree 404 can be replaced with other non-tree or tree-based structures such as decision trees or random forests, which can also be used for anomaly detection by evaluating the depth of the nodes where observations are isolated.

The non-flagged observation 406 refers to data points within the dataset that are not identified as anomalies by the anomaly detection model 402. These observations fall within the expected range of values and patterns established by the model. The flagged observation 408 refers to data points that are identified as potential anomalies by the anomaly detection model 402. The flagged observation 408 exhibit unusual patterns or values that deviate from the norm and are flagged for further investigation. The degree of deviation can be customizable by a user. In some implementations, flagged observation 408 can be prioritized based on the severity of the deviation or other user-provided context (e.g., type of deviation, extent of deviation). The anomaly 410 can refer to a specific type of flagged observation 408 that has been confirmed as an anomaly. Anomalies 410 represent significant deviations (e.g., above a certain threshold) from the expected patterns and can indicate errors or other unusual activities.

FIG. 5 illustrates an example environment 500 of a root cause evaluation engine 112 of the data management platform 104 of FIG. 1 for identifying root causes of the anomalies of the dataset. Environment 500 includes antecedent 502 and consequent 504. Implementations of example environment 500 can include different and/or additional components or can be connected in different ways.

The antecedent 502 refers to the condition or set of conditions that precede and potentially cause an observed anomaly in the dataset. For an association rule, the antecedent is the "if" portion of the rule, representing the combination of factors that lead to a particular outcome. On the other hand, the consequent 504 is the outcome or result that follows from the antecedent 502 in an association rule. The consequent 504 represents the "then" portion of the rule, indicating the effect or anomaly that occurs when the antecedent conditions are met. The root cause evaluation engine 112 operates within environment 500 to identify the antecedent 502 and consequent 504 relationships that explain the root causes of anomalies in the dataset. The root cause evaluation engine 112 can use association rule mining to discover patterns and correlations between different variables. Further methods of determining the root cause are discussed with reference to FIG. 7.

Figure 6:
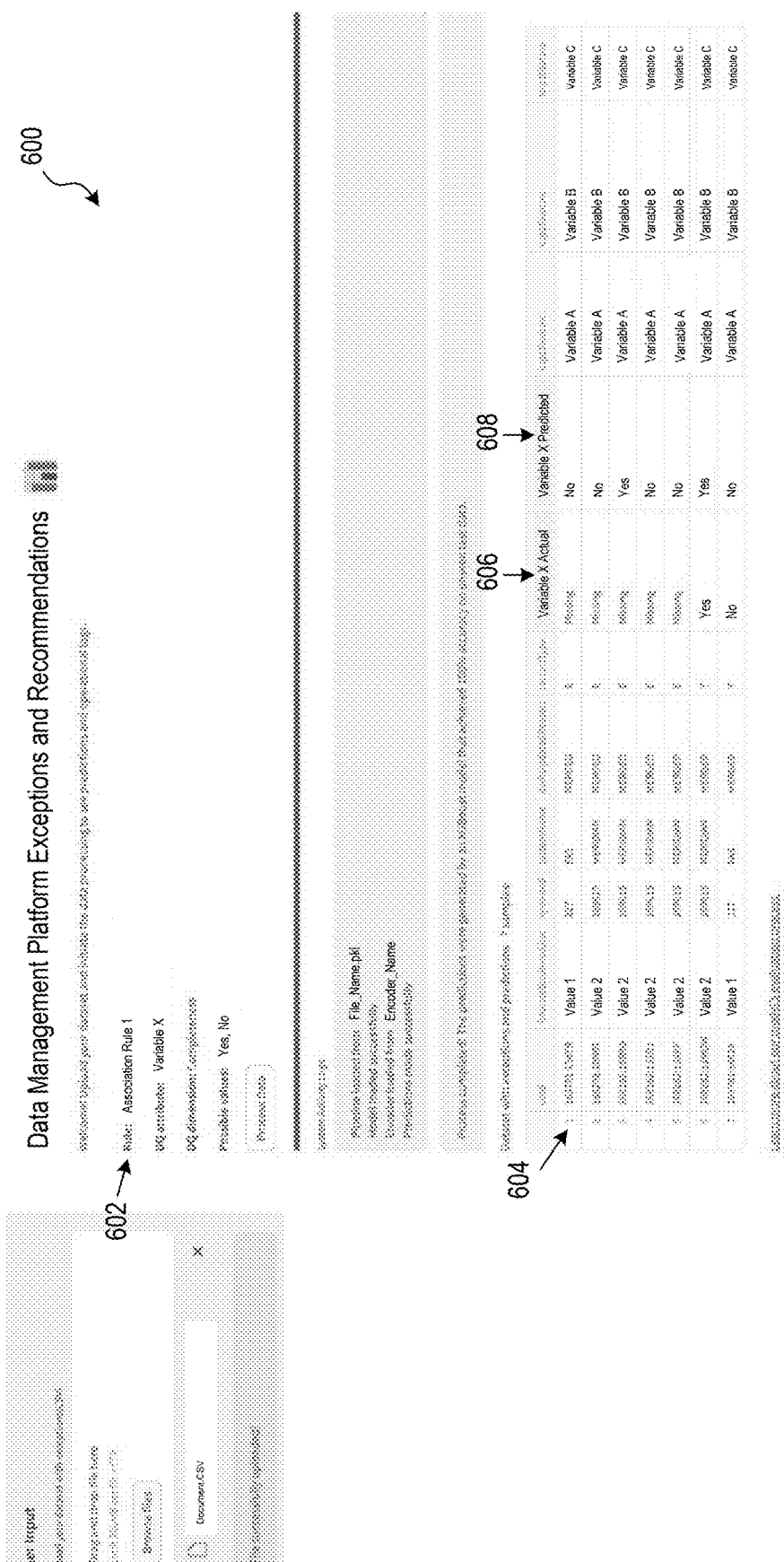
FIG. 6 illustrates an example environment of a remediation engine of the data management platform of FIG. 1 for remediating the anomalies of the dataset.

FIG. 6 illustrates an example environment 600 of a remediation engine 116 of the data management platform 104 of FIG. 1 for remediating the anomalies of the dataset. Environment 600 includes association rule 602, observation 604, observed variable values 606, and recommended variable values 608. Implementations of example environment 600 can include different and/or additional components or can be connected in different ways.

The association rule 602 refers to a rule derived from data mining techniques that identifies relationships between variables in the dataset. The association rule 602 can include an antecedent (if portion) and a consequent (then portion), indicating that when certain conditions are met, a specific outcome is likely to occur. The observation 604 can be the same as or similar to observations 204 and/or observation

302. The observed variable values 606 refer to the values of the variables in an observation 604. The values are used to evaluate the observation against the association rules 602 to determine if any anomalies are present (e.g., missing values). The recommended variable values 608 are the suggested values for the variables in an observation 604 that would align the observation with the expected patterns or rules. The recommendations can be generated by the remediation engine 116 based on the association rules 602 and the identified anomalies. The remediation engine 116 compares the association rules 602 against expected association rules, and generates recommended variable values 608 to address identified anomalies. For example, if a particular association rule indicates a particular bias not within the operative boundaries of the dataset's use case (e.g., a social bias in a financial risk assessment use case), the remediation engine 116 can identify the particular association rule as an anomaly.

FIG. 7 is a flow diagram illustrating an example process 700 of remediating anomalies using the data management platform 104 of FIG. 1. In some implementations, the process 700 is performed by components of example devices 1500 illustrated and described in more detail with reference to FIG. 15. Particular entities, for example, the AI model(s), are illustrated and described in more detail with reference to AI system 1400 in FIG. 14. Implementations of process 700 can include different and/or additional operations or can perform the operations in different orders.

In operation 702, the data management platform 104 can receive a dataset (structured or non-structured) including an observed set of values for one or more variables in a set of variables. In some implementations, the data management platform 104 can receive the dataset through various data ingestion methods, such as integrating with one or more application programming interface(s) (API(s)). The dataset can be sourced from multiple origins, including databases, data lakes, cloud storage, or external APIs. For structured data, the dataset can be in formats such as CSV, JSON, XML, or SQL tables, while unstructured data can include text files, images, audio recordings, or video files.

In operation 704, the data management platform 104 can identify, using a first set of AI models, a set of anomalies in the observed set of values of one or more variables in the structured dataset. The data management platform 104 can determine multiple reference patterns that correspond to an expected set of values for the set of variables, and/or compare an observed set of patterns in the observed set of values against the multiple reference patterns.

In some implementations, the models can include supervised learning models, such as decision trees, support vector machines, and neural networks, which are trained on labeled datasets to recognize normal and anomalous patterns. The models can additionally or alternatively include unsupervised learning models, such as clustering algorithms (e.g., K-means, DBSCAN) to group similar observations together based on their features and anomaly detection models (e.g., isolation forests, one-class SVMs), which do not require labeled data and can detect anomalies based on deviations from the learned patterns of the dataset. For example, an isolation forest model (e.g., anomaly detection model 402 in FIG. 4) can construct multiple binary trees to partition the data and isolate observations that deviate beyond a certain threshold from the norm. Observations that require fewer splits to isolate can be considered anomalies. In some implementations, the platform can use ensemble methods, combining the outputs of multiple models. For example, the platform can use a combination of statistical tests, machine learning models, and clustering algorithms, and aggregate the results of the multiple models by using a weighted score or using a majority vote.

The data management platform 104 can determine multiple reference patterns that correspond to an expected set of values for the set of variables. The reference patterns can be derived from historical data, statistical analysis, and/or domain-specific knowledge. For example, the data management platform 104 can use time-series analysis to identify seasonal trends and patterns in the data, or the data management platform 104 can calculate expected ranges and distributions for the variables (e.g., using chi-square goodness of fit tests). In some implementations, the platform can use dynamic threshold models to adaptively set thresholds based on historical behavior. For example, the data management platform 104 can evaluate past data to determine the typical range of values for a variable during different times of the year and set dynamic thresholds that account for seasonal variations. Thus, the data management platform 104 can detect anomalies that deviate from the expected reference patterns while accounting for natural fluctuations in the data.

The data management platform 104 can compare the observed set of patterns in the observed set of values against the multiple reference patterns to identify anomalies. For example, the data management platform 104 can calculate the Z-score (e.g., how many standard deviations an element is from the mean of the dataset) for each observed value, to determine whether the value significantly deviates from the mean. Values with a Z-score above a certain threshold (e.g., ±3) can be considered anomalies, indicating that they are rare and unusual compared to the rest of the data. In another example, the data management platform 104 can calculate the Mahalanobis distance, which measures the distance between a point and a distribution, to identify multivariate anomalies (i.e., data points that are beyond a certain threshold from the center of the distribution).

In operation 706, using a second set of AI models, the data management platform 104 can evaluate the identified set of anomalies by dynamically generating an observed set of association rules configured to cause the second set of AI models to generate the observed set of values in the structured dataset, and/or compare the observed set of association rules with an expected set of association rules to determine one or more observed association rules corresponding to the set of anomalies. The generated association rules can describe the relationships between different variables in the dataset. For example, an association rule can state that if variable A has a certain value, then variable B is likely to have a specific value. The data management platform 104 can identify frequent itemsets, which are combinations of variable values that occur frequently within the dataset, by counting the occurrences of different itemsets and determining which itemsets meet a predefined support threshold, indicating that they are frequent.

From these frequent itemsets, the data management platform 104 can generate association rules that describe the relationships between different variables. Each rule can have the form "If antecedent, then consequent," where the antecedent and consequent are subsets of the itemset. The data management platform 104 can calculate metrics such as confidence, which measures the proportion of records containing the antecedent that also contain the consequent, and/or lift, which quantifies how much more likely the consequent (the outcome) is to occur when the antecedent (the condition) is present, compared to when the antecedent is not present (i.e., the degree to which the occurrence of the antecedent increases the likelihood of the consequent occurring).

The expected set of association rules can be derived from historical data, domain knowledge, or predefined guidelines. By comparing the observed rules with the expected rules, the platform can identify which rules deviate from the norm and are associated with the anomalies. For example, if an observed association rule is not found in the expected association rules, the observed association rule can be flagged as a potential anomaly. Additionally or alternatively, if an observed association rule shows a significantly higher lift value than a corresponding expected association rule, it may indicate a stronger-than-expected association between the variables, potentially signaling an anomaly. Conversely, if an observed association rule has a much lower support or confidence value than the expected association rule, it may indicate that the expected pattern is not occurring as frequently as anticipated, which could also be a sign of an anomaly.

In operation 708, using a third set of AI models, the data management platform 104 can generate a set of reconfiguration commands to remove the identified set of anomalies. For example, the data management platform 104 can identify a portion of the observed sets of values corresponding to the one or more observed association rules corresponding to the set of anomalies, and map the portion of the observed sets of values to one or more expected association rules configured to adjust the portion of the observed set of values to a corresponding expected set of values. For example, if an observed association rule indicates that a certain combination of variable values is anomalous, the data management platform 104 can refer to the corresponding expected association rule to identify the expected values. The data management platform 104 can generate reconfiguration commands that specify the adjustments to transform the observed values to the expected values. In some implementations, the data management platform 104 can select the third set of AI models from multiple AI models using a respective set of performance metric values (e.g., accuracy, precision, recall, F1 score, mean squared error, and so forth) of each of the multiple AI models.

In operation 710, the data management platform 104 can automatically execute the set of reconfiguration commands on the structured dataset to modify the one or more observed association rules corresponding to the set of anomalies to align with the one or more expected association rules. The data management platform 104 can use SQL queries to select the observations specified in the reconfiguration commands. The data management platform 104 can update the values of specific variables, recalculate derived fields, adjust the relationships between variables, and so forth. For example, if an observed association rule indicates that a certain combination of variable values is anomalous, the platform updates the values of the affected variables to match the expected combination specified by the corresponding expected association rule.

In some implementations, the data management platform 104 can receive an unstructured dataset from including one or more of: text documents, emails, chat logs, images, or voice recordings. Using a fourth set of AI models, the data management platform 104 can evaluate the unstructured dataset against a set of predefined criteria. For example, the data management platform 104 can extract a set of information from the unstructured dataset, which can include a set of entities. The data management platform 104 can evaluate the set of information against a set of threshold values of the set of predefined criteria by measuring, for example, a degree of completeness of the extracted information, a degree of accuracy of the extracted information, a degree of satisfaction of the extracted information with specific formats of the set of predefined criteria, and so forth.

Using the evaluation, the fourth set of AI models can identify a portion of the extracted information failing to satisfy the set of threshold values. The data management platform 104 can generate a set of actions (e.g., reconfiguration commands) to increase the degree of satisfaction of the extracted information against a set of predefined criteria. The reconfiguration commands can include, for example, instructions to automatically execute a set of workflows for a first type of anomaly, triggering one or more alerts for a second type of anomaly, and so forth.

The data management platform 104 can display an artifact such as a compliance report indicating one or more of (i) the identified set of anomalies, (ii) the set of actions, (iii) a degree of satisfaction of the unstructured dataset with the set of predefined criteria, and so forth. The reports can be presented in various formats, such as dashboards, charts, tables, chatbots, and so forth.

Figure 8:
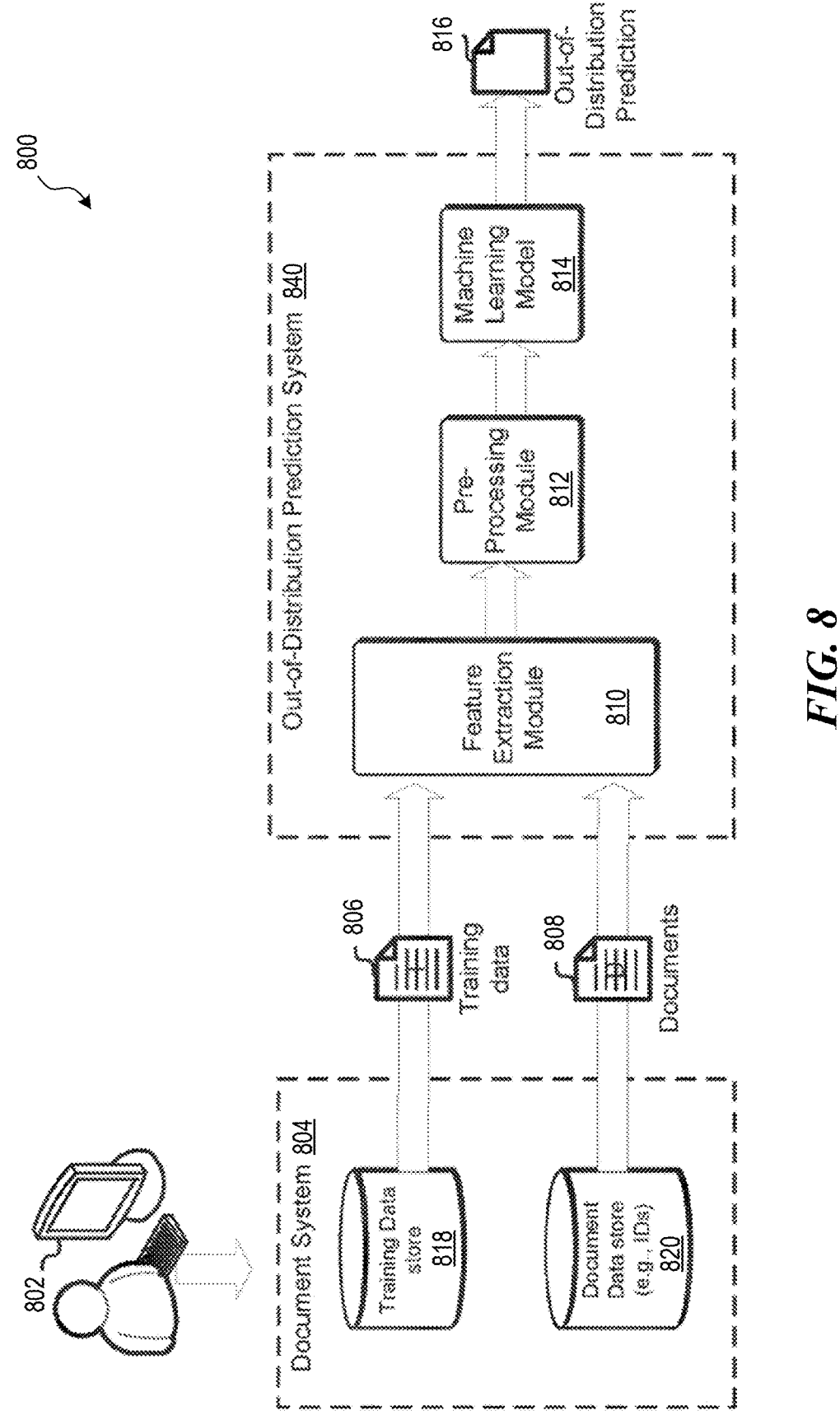
FIG. 8 illustrates an example of an overview of an out-of-distribution prediction system.

Example Out-of-Distribution Prediction System of the Data Management Platform FIG. 8 illustrates an aspect of an environment 800 for an out-of-distribution prediction system 840 of the data management platform 104 in which an implementation may be practiced. In some implementations, users 802 of this environment 800 include but are not limited to client users of the out-of-distribution prediction system 840. In at least one implementation, as illustrated in FIG. 8, the environment 800 includes an out-of-distribution prediction system 840 as described herein, that receives a training document of training data 806 that may be used to train a machine learning model 814. In at least one implementation, a feature extraction module 810 identifies and extracts relevant features of the training data 806 or input data, such as documents 808, to be further processed (e.g., encoding, embedding, and/or masking) by a pre-processing module 812, and then provided to the machine learning model 814. In at least one implementation, the out-of-distribution prediction system 840 receives documents 808 as input data to the machine learning model 814, and generates, as an output of the machine learning model 814, an out-of-distribution prediction 816. The terms "documents" and "document" may be used interchangeably in the present disclosure where the scope of the implementation can include "one or more documents."

In at least one implementation, the user 802 of this environment 800 include but are not limited to client users of the out-of-distribution prediction system 840. In at least one implementation, the user 802 may be an individual, a computing system, an executing software application, a computing service, a computing resource, or other entity capable of controlling input to and receiving output from the out-of-distribution prediction system 840. The user 802 may have access to a set of user records and/or a profile with the out-of-distribution prediction system 840, and may have a set of credentials (e.g., username, password, etc.) registered with the out-of-distribution prediction system 840. In at least one implementation, user 802 presents, or otherwise proves, the possession of security credentials, such as by inputting a password, access key, and/or digital signature, to gain access to out-of-distribution prediction. In at least one implementation, the user 802 creates, using a user device or other computing device, an account with the out-of-distribution prediction system 840. In at least one implementation, user 802 uploads documents 808 to the out-of-distribution prediction system 840 causing the machine learning model 814 to generate a prediction 816 of whether the documents 808 are in-distribution or out-of-distribution. For example, the machine learning model expects a specific type of data when it is being trained to perform operations. In at least one implementation, if a user 802 uploads a document that is an "unexpected" document (e.g., a driver's license, when the model is being trained to distinguish passports from national identity documents (IDs)), the machine learning model 814 may generate an out-of-distribution prediction 816 that the unexpected document is an outlier or an unknown document to in distribution documents.

In at least one implementation, the document system 804 includes a training data store 818 and document data store 820. In at least one implementation, the document system 804 is a repository providing non-transitory and persistent (non-volatile) storage for data objects. Examples of data stores include file systems, relational databases, non-relational databases, object-oriented databases, comma delimited files, and other files. In some implementations, the document system 804 comprises is a distributed data store. In at least one implementation, the training data store 818 may store training data 806 and information related to in-distribution data and out-of-distribution data. In at least one implementation, the document data store 820 may store documents 808 and information related to user documents (e.g., IDs, passports, or driver's licenses).

In at least one implementation, training data 806 may be maintained in the training data store 818 and located, processed, and provided for use in processing by the out-of-distribution prediction system 840 for training the machine learning model 814. For example, training data 806 may include, but is not limited to, a document bundles, national identification, driver's license, or passports. In at least one implementation, each page of training data 806, may be independently processed separately from other pages. In at least one implementation, each page of training data 806 may be processed as a whole with all pages included.

In at least one implementation, documents 808 may be maintained in the document data store 820 and located, processed, and provided for use in processing by the out-of-distribution system 840, as input, to the machine learning model 814 to perform inferencing operations. For example, documents 808 may include, but is not limited to, a document bundles, national identification, driver's license, or passports. In at least one implementation, each page of a document, such as document 808, may be independently processed separately from other pages. In at least one implementation, each document, such as document 808, may be processed as a whole with all pages included.

In at least one implementation, a feature extraction module 810 may include an encoder that encodes input data to a machine learning module 814, such as training data 806 or documents 808, into one or more feature vectors. In at least one implementation, an encoder of the feature extraction module 810 encodes training data 806 and/or document 808 into a sentence embedding vector. In at least one implementation, a processor uses this sentencing embedding vector to perform a nearest neighbor search to generate one or more neighbors. In at least one implementation, one or more neighbors is a value corresponding to a key comprising training data 806 or documents 808. In at least one implementation, one or more neighbors comprise plaintext data.

In at least one implementation, an encoder of the feature extraction module 810 encodes one or more neighbors into a text embedding vector. In at least one implementation, encoder of the feature extraction module 810 encodes one or more neighbors into a sentence embedding vector. In at least one implementation, machine learning model 814 uses training data 806 and/or documents 808 to generate a prediction, such as out-of-distribution prediction 816. In at least one implementation, a processor of a client device interfaces with an application of the out-of-distribution system 840 using a machine learning (ML) model application programming interface(s) (API(s)). In at least one implementation, the processor accesses the machine learning model 814 using the machine learning model application programming interface(s) (API(s)).

In at least one implementation, the pre-processing module 812 may be a computing system, software, software program, hardware device, module, or component capable of performing the masking of training data 806 and/or input data, such as documents 808, to generate masked training data and/or masked input data, respectively. In at least one implementation, further in the implementation, the masked training data is provided to the machine learning model 814 to perform training operations of the machine learning model 814, and the masked input data is provided to the machine learning model 814 to perform inferencing operations associated with classifications and predictions of whether documents 808 are out-of-distribution 816.

In at least one implementation, parts, methods and/or systems described in connection with FIG. 1 are as further illustrated non-exclusively in any of FIGS. 8-15.

Figure 9:
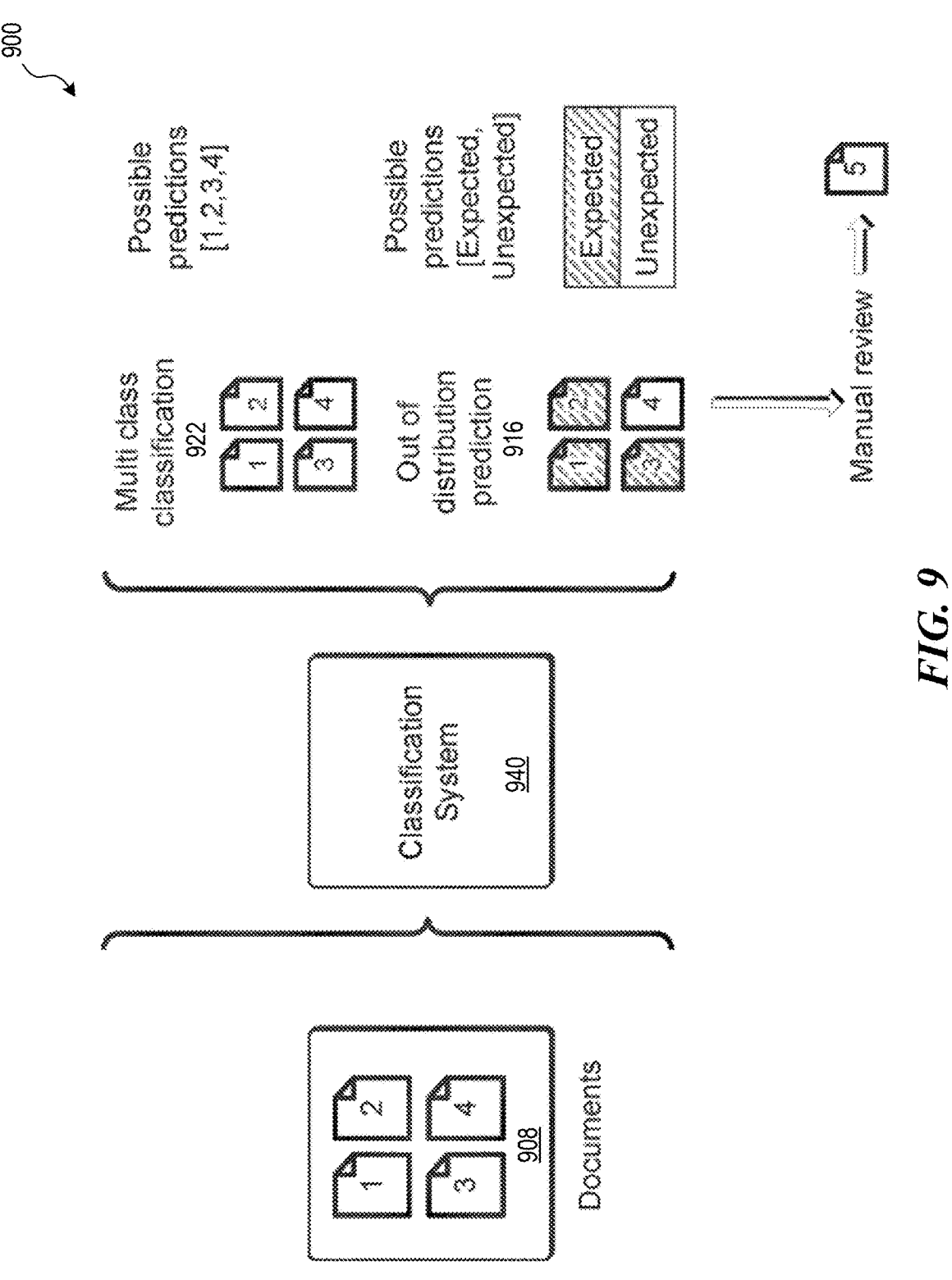
FIG. 9 illustrates an example of a classification system of an out-of-distribution prediction system of the data management platform of FIG. 1.

FIG. 9 illustrates an example of a classification system, in accordance with an implementation. As illustrated in FIG. 9, the example 900 includes a classification system 940, such as the out-of-distribution prediction system 804, that receives documents 908 (including documents #1-4) and makes a prediction, such as an out-of-distribution prediction 916, with a machine learning model, such as machine learning model 814 in FIG. 8. In at least one implementation, if the out-of-distribution prediction 916 of a document is an unexpected prediction, for example, document #4 of the documents 908 is unknown in the in-distribution documents, this document may be sent for manual review.

In at least one implementation, the classification system 940 generates a classification of a document. For example, the classification system may be used to distinguish between of national identifications (IDs) and a passport. In at least one implementation, if the classification system 940 receives documents 908, from a user of the system, such as user 802 in FIG. 8, the classification system 940 may classify the documents as a passport or an ID and obtain an associated confidence score with that decision. In at least one implementation, a processor of the classification system 940 performs operations to compare the confidence score to a threshold value. In at least one implementation, the threshold value is determined by using training data, such as training data 806 in FIG. 8.

In at least one implementation, the classification system 940 generates a prediction of the classification of the documents 908. In at least one implementation, the classification system 940 is automated classification library that enables multi-class classification 922. In at least one implementation, the automated classification library is data agnostic. In at least one implementation, the classification system 940 classifies documents 908 by simultaneously performing image patch and text token masking during the training of a machine learning model, such as machine learning model

814 in FIG. 8. In at least one implementation, as a result of simultaneous image patch and text token masking during training, the machine learning model may learn the majority of important features for each class. In at least one implementation, the prediction may be expected or unexpected. In at least one implementation, if the prediction is expected, the document is consistent with the in-domain data. In at least one implementation, if the prediction is unexpected, the document is consistent with the out-of-domain data and may be sent out for manual review. In at least one implementation, the classification system 940 may cause a user of the system, such as user 802 in FIG. 8, to perform a manual review of the unexpected document or outlier.

In at least one implementation, parts, methods and/or systems described in connection with FIG. 9 are as further illustrated non-exclusively in any of FIGS. 8-15.

FIG. 10 illustrates an example 1000 of visual token mask masking, in accordance with an implementation. In at least one implementation, this visual token masking includes in-distribution class one 1006A, in-distribution class two 1006B, out-of-distribution document 1006C, and out-of-distribution document 1006D that are used to train a machine learning model to distinguish between an in-domain document and out-of-distribution document (or outlier document). Each of the in-distribution class one 1006A, the in-distribution class two 1006B, the out-of-distribution document 1006C, and the out-of-distribution document 1006D include various shapes (e.g., an oval, a square, and a triangle) that represent features (e.g., tokens) of documents, such as training data 806 and/or documents 808 in FIG. 8, that are to be translated into dense vector embeddings for training the machine learning model.

In at least one implementation, an out-of-distribution prediction system may translate each of the features of the in-distribution class one 1006A and the features of the in-distribution class two 1006B into a dense vector that is used to train a machine learning model. In at least one implementation, in-distribution class one 1006A represents a document including features that correspond to a classification of a document that is in-domain or alternatively known as in-distribution. As an example, this classification may identify a document as a passport. In at least one implementation, in-distribution class two 1006B represents a document including features that correspond to a different classification of another document that is in-domain. In this example, this different classification may identify a document as a national identification.

In at least one implementation, the out-of-distribution prediction system may translate each of the features of the out-of-distribution document 1006C and the features of the out-of-distribution document 1006D into a dense vector that is used to train a machine learning model. In at least one implementation, the out-of-distribution document 1006C represents a document including features that correspond to a document that is out-of-distribution. In at least one implementation, a As an example, the out-of-distribution document 1006C may be used as input to a machine learning model that outputs a prediction that this out-of-distribution document 1006C is not in-domain. In at least one implementation, out-of-distribution document 1006D represents another document including a different set of features that correspond to a document that is out-of-distribution.

In at least one implementation, the in-distribution class one 1006A and the in-distribution class two 1006B represent documents of in-domain data. For example, in-domain data may be data that a machine learning model is being trained to classify (e.g., passports versus a national identity document). In at least one implementation, the out-of-distribution document 1006C and out-of-distribution document 1006D represent a "foreign" or unknown document relative to the in-domain documents that the machine learning model is being trained to classify. In at least one implementation, as a result of the masking, the machine learning model may be more robust at identifying in-domain documents (e.g., in-distribution class one 1006A and the in-distribution class two 1006B). For example, the machine learning model is able to classify documents as in-domain or in-distribution that have more similar features to the original in-distribution documents used to train the model than to the original out-of-distribution documents (used to train the model).

In at least one implementation, a processor of the out-of-distribution prediction system masks image data during training to make the machine learning model more robust to a variety of features, such as described above. In at least one implementation, the processor masks image data of input data (e.g., a passport or national identity document) during inferencing.

In at least one implementation, parts, methods and/or systems described in connection with FIG. 10 are as further illustrated non-exclusively in any of FIGS. 8-15.

Figure 11:
FIG. 11 illustrates an example of visual patch mask masking.

FIG. 11 illustrates an example 1100 of visual patch mask masking, in accordance with an implementation. In at least one implementation, this visual patch mask masking includes in-distribution class one 1106A, in-distribution class two 1106B, and out-of-distribution document 1106C that are used to train a machine learning model to distinguish between an in-domain document and out-of-distribution document or outlier document. Each of the in-distribution class one 1106A, the in-distribution class two 1106B, and the out-of-distribution document simple 1106C include various shapes that represent features (e.g., tokens) of documents, some of the shapes are overlaid with a "patch" to mask or omit the corresponding features from those features to be used for training the machine learning model. In at least one implementation, each feature map pixel may be a token. In at least one implementation, the patch that overlays one or more features of training document or document to be classified is a computer-generated geometric shape. In at least one implementation, the computer-generated shape obfuscates one or more features of a training document or document to be classified by the machine learning model. In at least one implementation, the system translates the features into dense vector embeddings for training the machine learning model, the features lacking those that were omitted by using the patch mask masking.

In at least one implementation, the out-of-distribution prediction system may translate each of the features of the in-distribution class one 1106A and the features of the in-distribution class two 1106B into a dense vector that is used to train the machine learning model. In at least one implementation, the system used masking of features in training documents (and documents for inferencing, not shown in FIG. 11) to increase the distance between learned dense embeddings of out-of-distribution data from in-distribution data. In at least one implementation and masking the features that resemble an oval and an equilateral triangle in out-of-distribution document 1106C, results in in-distribution classes and out-of-distribution documents that do not share any features in common. In at least one implementation, the system omits or masks features in documents for training machine learning models to create more robust trained machine learning models. In at least one implementation, in-distribution class one 1106A represents a document including features that correspond to a classification of a document that is in-domain. In at least one implementation, in-distribution class two 1106B represents a document including features that correspond to a different classification of another document that is in-domain.

Not shown in FIGS. 10 and 11 is token "text" masking. For example, the features (e.g., shapes) may represent tokens from a random sentence to be used in an array. In at least one implementation, token text matching may implement feature extraction and feature masking to train a machine learning model to distinguish in-domain documents from out-of-domain documents. In at least one implementation, the system performs image patch masking and text token matching simultaneously during training of the machine learning model. The simultaneous patch and text token masking allows for more separation in the extracted dense vectors between the in-domain and out-of-distribution data, as out-of-distribution data is dissimilar to the in-domain data and thus have less relevant features. In at least one implementation, token text masking comprises attention masking to inform the machine learning model which tokens are padding, and which tokens are to be processed.

In at least one implementation, a processor of a computer system of the out-of-distribution prediction system, such as out-of-distribution prediction system 840 in FIG. 8, may perform masking of image data or text image (not shown in FIG. 10 or 11). In at least one implementation, parts, methods and/or systems described in connection with FIG. 11 are as further illustrated non-exclusively in any of FIGS. 8-15.

Figure 12:
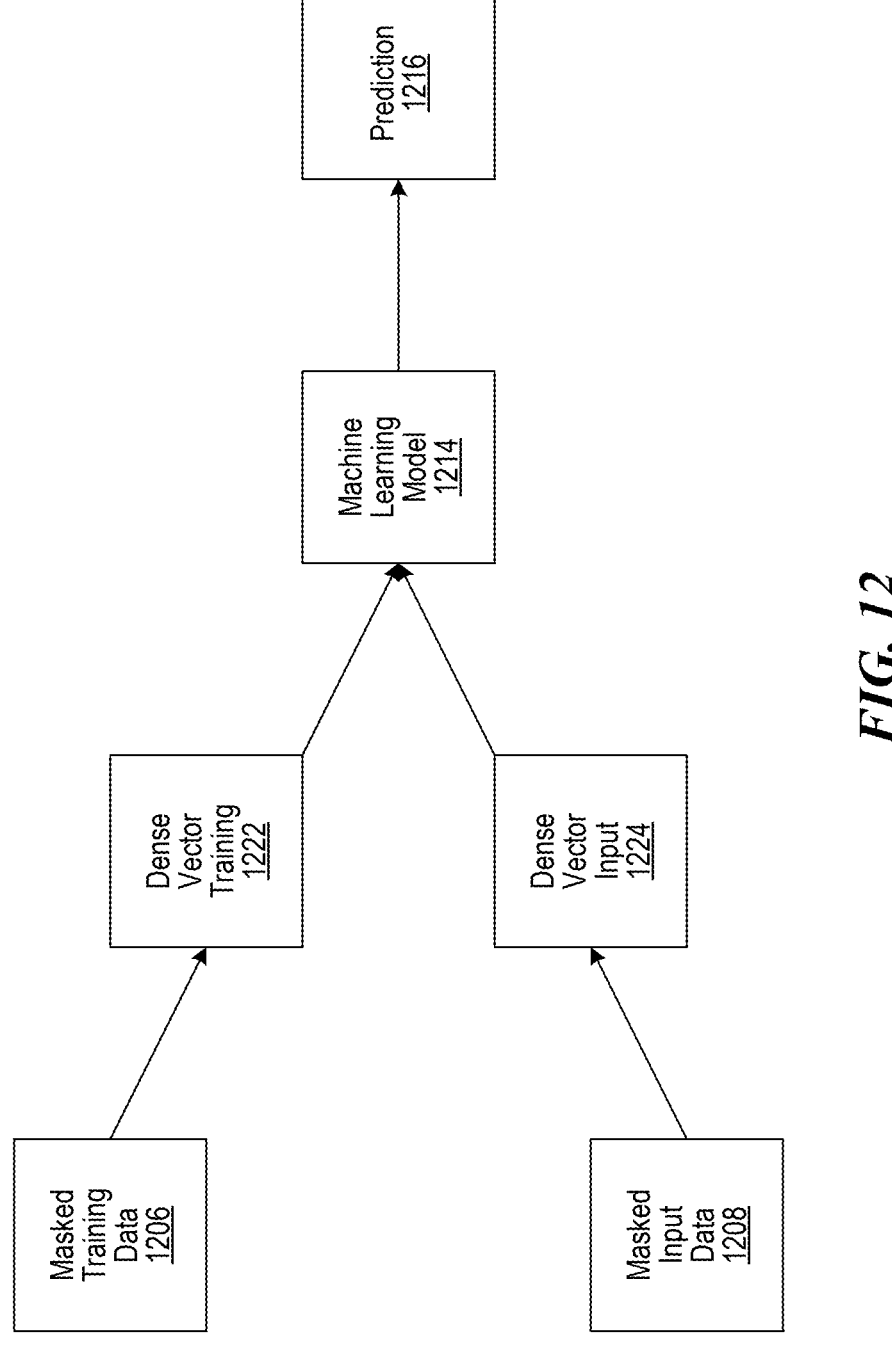
FIG. 12 illustrates an example environment of the out-of-distribution prediction system of the data management platform of FIG. 1.

FIG. 12 illustrates an example 1200 of an out-of-distribution (and outlier) prediction system, in accordance with an implementation. In at least one implementation, this out-of-distribution prediction system, which is similar to out-of-distribution prediction system 840 in FIG. 8, includes masked training data 1206 and masked input data 1208 that are translated into dense vector embeddings, such as dense vector training (data) 1222 and dense vector input (data) 1224, which are used to train a machine learning model 1214. In at least one implementation, the machine learning model generates a prediction 1216 of whether a document or input data is an in-domain document and out-of-distribution document or outlier document.

In at least one implementation, the system performs masked feature learning to train a machine learning model to detect out-of-distribution documents or outlier documents. In at least one implementation, the system extracts a set of features from a training document, such as training data 806 in FIG. 8, to generate the masked training data 1206. As described above, the system may perform visual token masking, visual patch masking, and token text masking to perform contrastive learning techniques. For example, contrastive learning is a deep learning technique using contrasting data samples against each other to learn attributes that are common between data classifications and attributes that set apart a data classification from others (e.g., a representation of data with similar instances being close together in a distribution space and dissimilar instances are set far apart).

In at least one implementation, as a result of performing feature masking, the system generates the masked training data 1206. In at least one implementation, the masked training data 1206 may include features from pixel image data, plaintext data, or layout data, or a combination of either image, plaintext, or layout data. In at least one implementation, these features include a set of features that result from omitting some features from both in-distribution training documents and out-of-distribution documents. In at least one implementation, some features that are omitted from training material to generate the masked training data 1206 may include features that are common to both in-distribution training documents and out-of-distribution documents. For example, if some of these features that are common, to both in-distribution and out-of-distribution documents, were left in the training material, it may serve little purpose in learning contrasting features of various classifications of training documents.

In at least one implementation, the system translates the masked training data 1206 into dense vector training data 1222 to train the machine learning model 1214. In at least one implementation, the dense vector training data 1222 may is an array of numbers with each element has a significant value. For example, in a random sentence, each word will have a significant value represented in a dense vector and may be used to learn other words in the sentence ("neighbors"). In at least one implementation, a training document (or input document) that may include plaintext data, image data, or layout data (or combination thereof) goes through an embedding layer and is converted into this dense vector training 1252 alternatively known as a dense embedding vector. In at least one implementation, the masked training data 1206 includes features of a training document that concatenated together to generate the dense vector training data 1222. In at least one implementation, the dense (embedding) vector training data 1222 are encoded and processed in the machine learning model 1214.

In at least one implementation, the dense vector training data 1222 may be a training forward propagation used to train the machine learning model 1214. In at least one implementation, the training forward propagation may include a storage of variables for input to the machine learning model 1214. In at least one implementation, the training forward propagation may include output of the machine learning model 1214.

In at least one implementation, the system extracts a set of features from an input document to generate the masked training data 1206. The input document is similar to documents 808 in FIG. 8 and documents 908 in FIG. 9. In at least one implementation, the system receives the input document to be processed by the machine learning model 1214 to generate the prediction 1216. In at least one implementation, the system translates the masked input data 1208 into dense vector input data 1224 to be used by the machine learning model 1214 to generate an inference. Here, the machine learning model 1214 generates a prediction 1216 of whether the input document is an in-distribution or out-of-distribution document. In at least one implementation, the dense vector input data 1224 is similar to the dense vector training data 1222, described above.

In at least one implementation, the prediction 1216 is an output of the machine learning model 1214. In at least one implementation, the prediction 1216 may be a classification of an input document, such as documents 808 in FIG. 8, that the machine learning model is trained to classify. In at least one implementation, the prediction 1216 may be generated by the machine learning model 1214 by using a threshold value on model confidence scores as a decision boundary to classify an unknown document into in-domain or out-of-distribution. The confidence scores may be generated during training of the machine learning model. In at least one implementation, the prediction 1216 may generated by calculating a distance score according to a Mahalanobis distance method, such as by calculating the distance between an extracted dense vector, such as dense vector input data 1224 of the document associated with the masked input data 1208 and classification conditional Gaussian distributions learned by the machine learning model 1214 during training. In at least one implementation, the prediction 1216 is generated by using a combination of the threshold value of the confidence scores and the distance score.

In at least one implementation, parts, methods and/or systems described in connection with FIG. 12 are as further illustrated non-exclusively in any of FIGS. 8-15.

Figure 13:
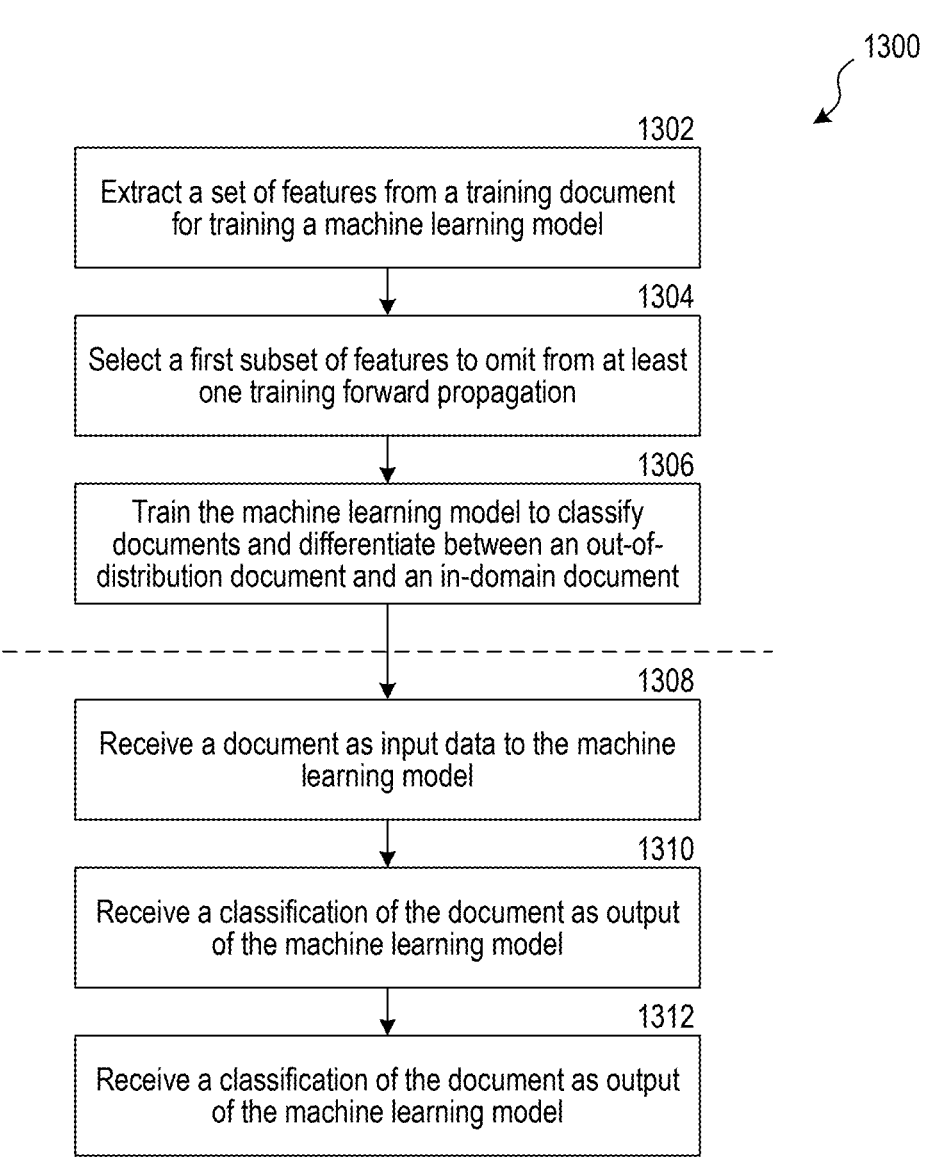
FIG. 13 is a flowchart that illustrates an example of the out-of-distribution prediction system that trains a machine learning model to identify whether a data object is out-of-distribution.

FIG. 13 is flowchart illustrating an example of an out-of-distribution prediction system that trains a machine learning model to identify whether a data object is out-of-distribution, in accordance with an implementation. Some or all of the process 1300 (or any other processes described, or variations and/or combinations of those processes) may be performed by one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 1300 may be performed by any suitable system, such as the computing device 1500 of FIG. 15. The process 1300 includes a series of operations wherein the system is performing process 1300 extract features from a training document, select features to mask from the training document to create masked training data, and train a machine learning model using the masked training data to detect an out-of-distribution document.

In 1302, in at least one implementation, one or more processors of the out-of-distribution prediction system, or alternatively known as a computing system or system, extract features from a training document for training a machine learning model. In at least one implementation, the features are extracted from the training document using a feature extraction module such as the feature extraction module 810 in FIG. 8. In at least one implementation, the features may include plaintext, image, and/or layout data.

In 1304, in at least one implementation, one or more processors of the out-of-distribution prediction system select a subset of features to omit from a training forward propagation. In at least one implementation, the one or more processors select the subset of features from the set of features extracted from the training document. In at least one implementation, the subset of features to omit or mask may be determined based on a pseudorandom process. In at least one implementation, a pseudorandom process to omit features may include masking plaintext data, input data, or layout data, or a combination thereof in a stochastically distributed manner. In at least one implementation, the pseudorandom process to omit features includes pseudorandomly determining data in a training document to mask for training the machine learning model. In at least one implementation, the pseudorandom process to omit features includes pseudorandomly determining data in a document to mask that is to be classified during inferencing operations. In at least one implementation, the pseudorandom process to omit features includes pseudorandomly determining data to mask in training operations of the machine learning model and in inferencing operations of the machine learning model. In this disclosure, for example, the system masks different parts of a document in a statistically random manner, so that masking performed over time results in predictions of documents with features that are expected for a given in domain classification and remaining features are unknown, creating greater separation between in domain and out-of-distribution data.

In some implementations, the pseudorandom process to omit features result in more robust predictions of in domain documents by training the machine learning model within domain documents that have much more relevant features (for what the model is trained to predict) than out-of-distribution documents. In some implementations, the pseudorandom process to omit features includes pseudorandomly selecting features to mask that are common to in domain and out-of-distribution documents. For example, to training a model to predict whether a document is a passport or a national identification (both in domain classifications), the system may mask features of name and date of birth, which are features also found in a driver's license that in this example is out-of-distribution. This masking of common features would result in a greater separation between features remaining in "in domain" documents and features in out-of-distribution documents that are irrelevant for passports or national identifications (e.g., a license #, a medical condition, or if the person is registered as an organ donor.)

In at least one implementation, the subset of features to omit may be determined based on selecting features of a training document or new document (e.g., input data) at consistent (e.g., approximately the same) location in the documents. In at least one implementation, the subset of features to omit may be determined by using a percentage or number (e.g., a parameter) specified by a user, client device, computer system, hardware, or software application of the system.

In 1306, in at least one implementation, one or more processors of the out-of-distribution prediction system train the machine learning model to produce a trained machine learning model, by using another subset of the features, from the training document, in the training forward propagation. In at least one implementation, the other subset of the features is different from the subset of features that are omitted from the training forward propagation (e.g., the other subset of features is disjoint from the omitted subset of features). In some implementations, a subset of features is disjoint from another subset of features when neither of the subsets have any features in common. In some implementations, the subset of features is disjoint from another subset of features if there is no "intersection" or "overlap" between the two subsets of features. For example, a set of features $\{1, 3, 5, 7\}$ is disjoint from another set of features $\{2, 4, 6, 8\}$, as none of the features or elements of the two sets of features are in common. In at least one implementation, a training forward propagation includes a process of passing ("propagating") input data through a network (e.g., neural network) and generating an output (e.g., prediction). In at least one implementation, the trained machine learning model outputs information usable to classify documents, such as documents 808 in FIG. 8. In at least one implementation, the trained machine learning model outputs information usable to differentiate between an out-of-distribution document and an in-distribution document (alternatively known as an in-domain document) In at least one implementation, the system trains the machine learning model using a masked training document to produce a trained machine learning model.

The dashed line indicates a separation in the process 1300 between training the machine learning model and using the machine learning model.

In 1308, in at least one implementation, one or more processors of the out-of-distribution prediction system receives a document as input data to the machine learning model. In at least one implementation, a processor of the out-of-distribution system performs operations to mask at least a portion of the input data to produce a masked input data. In at least one implementation, the processor performs operations to provide the masked input data to the trained machine learning model as input.

In 1310, in at least one implementation, one or more processors of the out-of-distribution prediction system perform operations to receive a classification of the document as an output of the machine learning model. In at least one implementation, the classification is generated by the system extracting a dense vector embedding of the document, comparing it to an in-domain dense vector embedding to obtain a confidence score, and then comparing that confidence score to a threshold value of confidence scores, obtained during the training of the machine learning model.

In 1312, in at least one implementation, one or more processors of the out-of-distribution prediction system perform instructions to determine that the document is an out-of-distribution document. In at least one implementation, the processor may perform operations to cause the out-of-distribution document to be sent for manual review. In at least one implementation, the manual review may be performed by a user of the out-of-distribution system, such as user 802 in FIG. 8, or by any entity designated as an in-domain data expert.

In at least one implementation, parts, methods and/or systems described in connection with FIG. 13 are as further illustrated non-exclusively in any FIGS. 8-15. Note that one or more of the operations performed in 1302-14 may be performed in various orders and combinations, including in parallel.

Note that, in the context of describing disclosed implementations, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Example Implementation of the AI Models of the Data Management Platform

Figure 14:
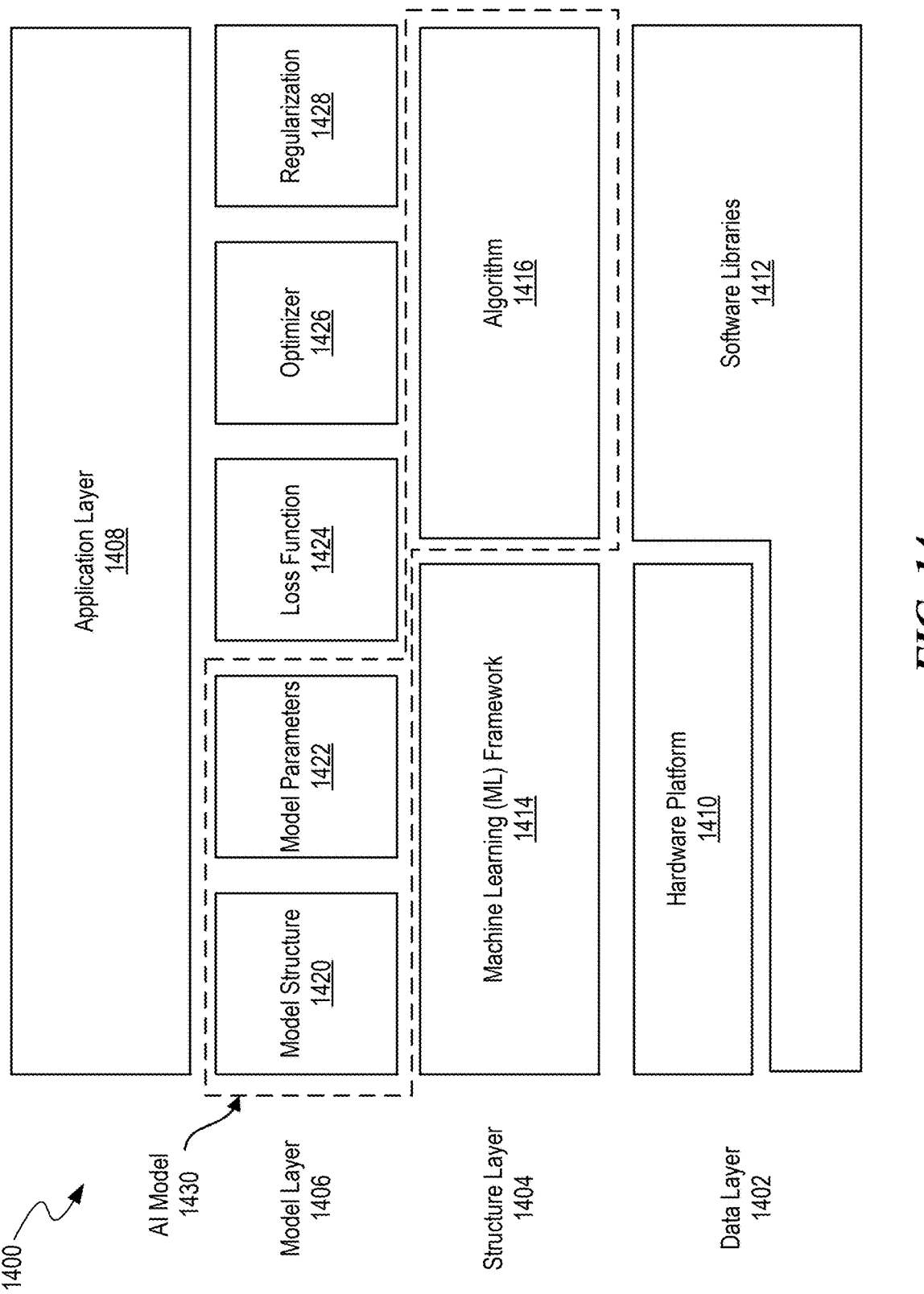
FIG. 14 illustrates a layered architecture of an artificial intelligence (AI) model system that can implement the machine learning models of the data management platform of FIG. 1.

FIG. 14 illustrates a layered architecture of an AI system 1400 that can implement the ML models of the data management platform 104 of FIG. 1, in accordance with some implementations of the present technology. Example ML models can include the models executed by the data management platform 104, such as remediation models, anomaly detection models, and so forth. Accordingly, the AI models of the data management platform 104 can include one or more components of the AI system 1400.

As shown, the AI system 1400 can include a set of layers, which conceptually organize elements within an example network topology for the AI system's architecture to implement a particular AI model. Generally, an AI model is a computer-executable program implemented by the AI system 1400 that analyses data to make predictions. Information can pass through each layer of the AI system 1400 to generate outputs for the AI model. The layers can include a data layer 1402, a structure layer 1404, a model layer 1406, and an application layer 1408. The algorithm 1416 of the structure layer 1404 and the model structure 1420 and model parameters 1422 of the model layer 1406 together form an example AI model. The optimizer 1426, loss function engine 1424, and regularization engine 1428 work to refine and optimize the AI model, and the data layer 1402 provides resources and support for application of the AI model by the application layer 1408.

The data layer 1402 acts as the foundation of the AI system 1400 by preparing data for the AI model. As shown, the data layer 1402 can include two sub-layers: a hardware platform 1410 and one or more software libraries 1412. The hardware platform 1410 can be designed to perform operations for the AI model and include computing resources for storage, memory, logic and networking, such as the resources described in relation to FIGS. 15 and 9. The hardware platform 1410 can process amounts of data using one or more servers. The servers can perform backend operations such as matrix calculations, parallel calculations, machine learning (ML) training, and the like. Examples of servers used by the hardware platform 1410 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 1410 can include computing resources, (e.g., servers, memory, etc.) offered by a cloud services provider. The hardware platform 1410 can also include computer memory for storing data about the AI model, application of the AI model, and training data for the AI model. The computer memory can be a form of random-access memory (RAM), such as dynamic RAM, static RAM, and non-volatile RAM.

The software libraries 1412 can be thought of suites of data and programming code, including executables, used to control the computing resources of the hardware platform 1410. The programming code can include low-level primitives (e.g., fundamental language elements) that form the foundation of one or more low-level programming languages, such that servers of the hardware platform 1410 can use the low-level primitives to carry out specific operations. The low-level programming languages do not require much, if any, abstraction from a computing resource's instruction set architecture, enabling them to run quickly with a small memory footprint. Examples of software libraries 1412 that can be included in the AI system 1400 include INTEL Math Kernel Library, NVIDIA cuDNN, EIGEN, and OpenBLAS.

The structure layer 1404 can include an ML framework 1414 and an algorithm 1416. The ML framework 1414 can be thought of as an interface, library, or tool that enables users to build and deploy the AI model. The ML framework 1414 can include an open-source library, an API, a gradient-boosting library, an ensemble method, and/or a deep learning toolkit that work with the layers of the AI system facilitate development of the AI model. For example, the ML framework 1414 can distribute processes for application or training of the AI model across multiple resources in the hardware platform 1410. The ML framework 1414 can also include a set of pre-built components that have the functionality to implement and train the AI model and enable users to use pre-built functions and classes to construct and train the AI model. Thus, the ML framework 1414 can be used to facilitate data engineering, development, hyperparameter tuning, testing, and training for the AI model. Examples of ML frameworks 1414 that can be used in the AI system 1400 include TENSORFLOW, PYTORCH, SCIKIT-LEARN, KERAS, LightGBM, RANDOM FOREST, and AMAZON WEB SERVICES.

The algorithm 1416 can be an organized set of computer-executable operations used to generate output data from a set of input data and can be described using pseudocode. The algorithm 1416 can include complex code that enables the computing resources to learn from new input data and create new/modified outputs based on what was learned. In some implementations, the algorithm 1416 can build the AI model through being trained while running computing resources of the hardware platform 1410. This training enables the algorithm 1416 to make predictions or decisions without being explicitly programmed to do so. Once trained, the algorithm 1416 can run at the computing resources as part of the AI model to make predictions or decisions, improve computing resource performance, or perform tasks. The algorithm 1416 can be trained using supervised learning, unsupervised learning, semi-supervised learning, and/or reinforcement learning.

Using supervised learning, the algorithm 1416 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of dataset 102 in FIG. 1) from various source computing systems described in relation to FIG. 1. Furthermore, training data can include pre-processed data generated by various engines of the data management platform 104 described in relation to FIG. 1. The user may label the training data based on one or more classes and trains the AI model by inputting the training data to the algorithm 1416. The algorithm determines how to label the new data based on the labeled training data. The user can facilitate collection, labeling, and/or input via the ML framework 1414. In some instances, the user may convert the training data to a set of feature vectors for input to the algorithm 1416. Once trained, the user can test the algorithm 1416 on new data to determine if the algorithm 1416 is predicting accurate labels for the new data. For example, the user can use cross-validation methods to test the accuracy of the algorithm 1416 and retrain the algorithm 1416 on new training data if the results of the cross-validation are below an accuracy threshold.

Supervised learning can include classification and/or regression. Classification techniques include teaching the algorithm 1416 to identify a category of new observations based on training data and are used when input data for the algorithm 1416 is discrete. Said differently, when learning through classification techniques, the algorithm 1416 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 1416 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships s between independent and dependent variables and are used when input data to the algorithm 1416 is continuous. Regression techniques can be used to train the algorithm 1416 to predict or forecast relationships between variables. To train the algorithm 1416 using regression techniques, a user can select a regression method for estimating the parameters of the model. The user collects and labels training data that is input to the algorithm 1416 such that the algorithm 1416 is trained to understand the relationship between data features and the dependent variable(s). Once trained, the algorithm 1416 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1416 learns patterns from unlabeled training data. In particular, the algorithm 1416 is trained to learn hidden patterns and insights of input data, which can be used for data exploration or for generating new data. Here, the algorithm 1416 does not have a predefined output, unlike the labels output when the algorithm 1416 is trained using supervised learning. Said another way, unsupervised learning is used to train the algorithm 1416 to find an underlying structure of a set of data, group the data according to similarities, and represent that set of data in a compressed format. The data management platform 104 can use unsupervised learning to identify patterns in claim history (e.g., to identify particular event sequences) and so forth. In some implementations, performance of the AI models of the data management platform that can use unsupervised learning is improved because the incoming dataset 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1416 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1416 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 1416 include factor analysis, item response theory, latent profile analysis, and latent class analysis.

The model layer 1406 implements the AI model using data from the data layer and the algorithm 1416 and ML framework 1414 from the structure layer 1404, thus enabling decision-making capabilities of the AI system 1400. The model layer 1406 includes a model structure 1420, model parameters 1422, a loss function engine 1424, an optimizer 1426, and a regularization engine 1428.

The model structure 1420 describes the architecture of the AI model of the AI system 1400. The model structure 1420 defines the complexity of the pattern/relationship that the AI model expresses. Examples of structures that can be used as the model structure 1420 include decision trees, support vector machines, regression analyses, Bayesian networks, Gaussian processes, genetic algorithms, and artificial neural networks (or, simply, neural networks). The model structure 1420 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 1420 may include one or more hidden layers of nodes between the input and output layers. The model structure 1420 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 1422 represent the relationships learned during training and can be used to make predictions and decisions based on input data. The model parameters 1422 can weight and bias the nodes and connections of the model structure 1420. For instance, when the model structure 1420 is a neural network, the model parameters 1422 can weight and bias the nodes in each layer of the neural networks, such that the weights determine the strength of the nodes and the biases determine the thresholds for the activation functions of each node. The model parameters 1422, in conjunction with the activation functions of the nodes, determine how input data is transformed into desired outputs. The model parameters 1422 can be determined and/or altered during training of the algorithm 1416.

The loss function engine 1424 can determine a loss function, which is a metric used to evaluate the AI model's performance during training. For instance, the loss function engine 1424 can measure the difference between a predicted output of the AI model and the actual output of the AI model and is used to guide optimization of the AI model during training to minimize the loss function. The loss function may be presented via the ML framework 1414, such that a user can determine whether to retrain or otherwise alter the algorithm 1416 if the loss function is over a threshold. In some instances, the algorithm 1416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1426 adjusts the model parameters 1422 to minimize the loss function during training of the algorithm 1416. In other words, the optimizer 1426 uses the loss function generated by the loss function engine 1424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1426 used may be determined based on the type of model structure 1420 and the size of data and the computing resources available in the data layer 1402.

The regularization engine 1428 executes regularization operations. Regularization is a technique that prevents over- and under-fitting of the AI model. Overfitting occurs when the algorithm 1416 is overly complex and too adapted to the training data, which can result in poor performance of the AI model. Underfitting occurs when the algorithm 1416 is unable to recognize even basic patterns from the training data such that it cannot perform well on training data or on validation data. The optimizer 1426 can apply one or more regularization techniques to fit the algorithm 1416 to the training data properly, which helps constraint the resulting AI model and improves its ability for generalized application. Examples of regularization techniques include lasso (L1) regularization, ridge (L2) regularization, and elastic (L1 and L2 regularization).

The application layer 1408 describes how the AI system 1400 is used to solve problem or perform tasks. In an example implementation, the application layer 1408 can include a front-end user interface of the data management platform 104.

Example Computing Environment of the Data Management Platform

Figure 15:
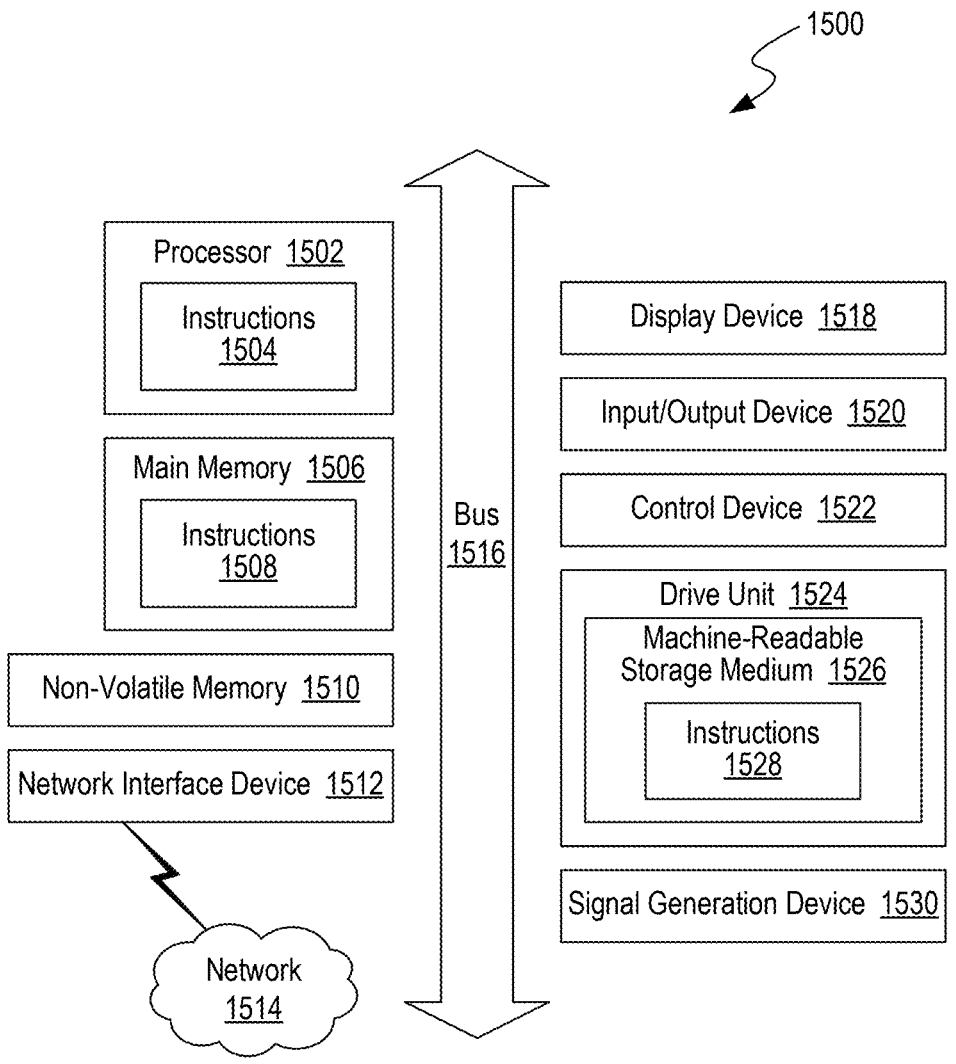
FIG. 15 is a block diagram showing some of the components typically incorporated in at least some of the computer systems and other devices on which the data management platform of FIG. 1 operates.

FIG. 15 is a block diagram showing some of the components typically incorporated in at least some of the computer systems and other devices 1500 on which the disclosed system operates in accordance with some implementations of the present technology. As shown, an example computer system 1500 can include: one or more processors 1502, main memory 1508, non-volatile memory 1512, a network interface device 1514, video display device 1520, an input/output device 1522, a control device 1524 (e.g., keyboard and pointing device), a drive unit 1526 that includes a machine-readable medium 1528, and a signal generation device 1532 that are communicatively connected to a bus 1518. The bus 1518 represents one or more physical buses and/or point-to-point connections that are connected by appropriate bridges, adapters, or controllers. Various common components (e.g., cache memory) are omitted from FIG. 15 for brevity. Instead, the computer system 1500 is intended to illustrate a hardware device on which components illustrated or described relative to the examples of the figures and any other components described in this specification can be implemented.

The computer system 1500 can take any suitable physical form. For example, the computer system 1500 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1500. In some implementations, the computer system 1500 can be an embedded computer system, a system-on-chip (SOC), a single-board computer system (SBC) or a distributed system such as a mesh of computer systems or include one or more cloud components in one or more networks. Where appropriate, one or more computer systems 1500 can perform operations in real-time, near real-time, or in batch mode.

The network interface device 1514 enables the computer system 1500 to exchange data in a network 1516 with an entity that is external to the computing system 1500 through any communication protocol supported by the computer system 1500 and the external entity. Examples of the network interface device 1514 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1508, non-volatile memory 1512, machine-readable medium 1528) can be local, remote, or distributed. Although shown as a single medium, the machine-readable medium 1528 can include multiple media (e.g., a centralized/distributed database and/or associated caches and servers) that store one or more sets of instructions 1530. The machine-readable (storage) medium 1528 can include any medium that is capable of storing, encoding, or carrying a set of instructions for execution by the computer system 1500. The machine-readable medium 1528 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1510, 1530) set at various times in various memory and storage devices in computing device(s). When read and executed by the processor 1502, the instruction(s) cause the computer system 1500 to perform operations to execute elements involving the various aspects of the disclosure.

Conclusion

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application.

Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A computer-implemented method for improving data quality using an artificial intelligence (AI) model, the method comprising:

obtaining a dataset representing an observed value set for each variable in a variable set;

identifying, using a first AI model set, an anomaly set from the observed value set in the dataset by comparing an observed pattern set from the observed value set against one or more reference patterns that correspond to an expected value set for the variable set;

using a second AI model set to evaluate the identified anomaly set by:

generating an observed association rule set configured to cause generation of the observed value set in the dataset, and comparing the observed association rule set with an expected association rule set to determine one or more observed association rules of the observed association rule set that correspond to the anomaly set;

determining a compliance indicator of the dataset based on a degree of satisfaction between the one or more observed association rules and the expected association rule set;

transmitting a representation of the compliance indicator of the dataset, wherein the representation indicates (a) the anomaly set and (b) a metadata set linked to the anomaly set;

responsive to obtaining a subsequent input, updating the representation by generating a computer-implemented command set configured to modify the one or more observed association rules corresponding to the anomaly set into alignment with one or more expected association rules.

2. The computer-implemented method of claim 1, wherein at least one model of the first AI model set or at least one model of the second AI model set are the same.

3. The computer-implemented method of claim 1, wherein updating the representation further comprises:

using a third AI model set to generate the computer-implemented command set.

4. The computer-implemented method of claim 3, further comprising:

executing the computer-implemented command set on the dataset.

5. The computer-implemented method of claim 3, wherein the third AI model set is configured to generate the computer-implemented command set by:

identifying a portion of the observed value set that corresponds to the one or more observed association rules that correspond to the anomaly set, and associating the portion of the observed value set to one or more expected association rules of the expected association rule set, the one or more expected association rules being configured to adjust the portion of the observed value set to a corresponding expected value set.

6. The computer-implemented method of claim 3, further comprising:

selecting the third AI model set from multiple AI models using a respective set of performance metric values of each of the multiple AI models.

7. The computer-implemented method of claim 1, wherein the metadata set is associated with one or more of: (a) a data lineage of the anomaly set or (b) a version of the anomaly set.

8. One or more non-transitory, computer-readable storage media comprising instructions thereon, wherein the instructions, when executed by at least one data processor of a system, cause the system to:

obtain a dataset representing an observed value set for each variable in a variable set;

identify, using a first artificial intelligence (AI) model set, an anomaly set from the observed value set in the dataset by comparing an observed pattern set from the observed value set against one or more reference patterns that correspond to an expected value set for the variable set;

use a second AI model set to evaluate the identified anomaly set by:

determining an observed rule set configured to cause generation of the observed value set in the dataset, and determining one or more observed rules of the observed rule set that correspond to the anomaly set;

determine a compliance indicator of the dataset based on a degree of satisfaction between the one or more observed rules and an expected rule set;

transmit a representation of the compliance indicator of the dataset, wherein the representation indicates (a) the anomaly set and (b) a metadata set linked to the anomaly set; and responsive to obtaining a subsequent input, update the representation by causing generation of a computer-implemented command set to remove one or more anomalies in the anomaly set from the observed value set in the dataset.

9. The one or more non-transitory, computer-readable storage media of claim 8, wherein the instructions further cause the system to:

cause execution of a set of workflows for a first type of anomaly, or cause trigger of one or more alerts for a second type of anomaly.

10. The one or more non-transitory, computer-readable storage media of claim 8, wherein the representation indicates a compliance status of the dataset with a predefined guideline set associated with the expected rule set.

11. The one or more non-transitory, computer-readable storage media of claim 8, wherein the expected rule set is configured to dynamically adjust based on a time period associated with the observed rule set.

12. The one or more non-transitory, computer-readable storage media of claim 8, wherein the dataset includes one or more of: text documents, emails, chat logs, images, or voice recordings.

13. The one or more non-transitory, computer-readable storage media of claim 8, wherein the representation is displayed on a user interface of a computing device.

14. The one or more non-transitory, computer-readable storage media of claim 8, wherein at least one model of the first AI model set or at least one model of the second AI model set are the same.

15. A system comprising:

at least one hardware processor; and at least one non-transitory memory storing instructions, which, when executed by the at least one hardware processor, cause the system to:

obtain a dataset representing an observed value set for each variable in a variable set;

identify, using a first artificial intelligence (AI) model set, an anomaly set from the observed value set in the dataset by comparing an observed pattern set from the observed value set against one or more reference patterns that correspond to an expected value set for the variable set;

use a second AI model set to evaluate the identified anomaly set by:

determining an observed rule set configured to cause generation of the observed value set in the dataset, and determining one or more observed rules of the observed rule set that correspond to the anomaly set;

determine a compliance indicator of the dataset based on a degree of satisfaction between the one or more observed rules and an expected rule set;

transmit a representation of the compliance indicator of the dataset, wherein the representation indicates one or more of: (a) the anomaly set or (b) a metadata set linked to the anomaly set; and responsive to obtaining a subsequent input, update the representation by causing execution of a computer-implemented command set to remove one or more anomalies in the anomaly set from the observed value set in the dataset.

16. The system of claim 15, wherein determine the compliance indicator further comprises:

comparing the degree of satisfaction against a predefined threshold, wherein the threshold is determined via a user input.

17. The system of claim 15, wherein the system is further caused to:

generate the computer-implemented command set configured to modify the one or more observed rules corresponding to the anomaly set into alignment with one or more expected rules.

18. The system of claim 17, wherein the system is further caused to:

execute the computer-implemented command set on the dataset.

19. The system of claim 15, wherein the metadata set is associated with one or more of: (a) a data lineage of the anomaly set or (b) a version of the anomaly set.

20. The system of claim 15, wherein at least one model of the first AI model set or at least one model of the second AI model set are the same.

* * * * *